United States Patent
Ozog

(10) Patent No.: US 10,675,768 B2
(45) Date of Patent: Jun. 9, 2020

(54) ROBOTIC END EFFECTOR ASSEMBLY, SYSTEM, AND METHOD OF USING THE SAME

(71) Applicant: The Boeing Company, Chicago, IL (US)

(72) Inventor: Stefan Ozog, Winnipeg (CA)

(73) Assignee: The Boeing Company, Chicago, IL (US)

( * ) Notice: Subject to any disclaimer, the term of this patent is extended or adjusted under 35 U.S.C. 154(b) by 197 days.

(21) Appl. No.: 15/937,690

(22) Filed: Mar. 27, 2018

(65) Prior Publication Data

US 2019/0299426 A1    Oct. 3, 2019

(51) Int. Cl.
| | | |
|---|---|---|
| *B25J 18/02* | (2006.01) | |
| *B25J 11/00* | (2006.01) | |
| *B25J 17/02* | (2006.01) | |
| *B25J 9/00* | (2006.01) | |
| *B23B 39/14* | (2006.01) | |

(52) U.S. Cl.
CPC .............. *B25J 18/02* (2013.01); *B23B 39/14* (2013.01); *B25J 9/0015* (2013.01); *B25J 11/005* (2013.01); *B25J 11/0055* (2013.01); *B25J 17/0225* (2013.01); *B23B 2215/04* (2013.01); *Y10S 901/23* (2013.01); *Y10S 901/41* (2013.01)

(58) Field of Classification Search
CPC ......... B23B 39/14; B25J 9/0015; B25J 18/02; B25J 11/005; B25J 11/0055; B25J 17/0225
See application file for complete search history.

(56) References Cited

U.S. PATENT DOCUMENTS

| | | |
|---|---|---|
| 4,898,501 A | 2/1990 | Palmer |
| 5,157,823 A | 10/1992 | Delaval et al. |
| 5,912,442 A | 6/1999 | Nye et al. |
| 8,220,588 B2 | 7/2012 | Thrash et al. |

(Continued)

FOREIGN PATENT DOCUMENTS

| | | |
|---|---|---|
| DE | 202006017265 U1 | 1/2007 |
| DE | 102009035877 A1 | 2/2011 |

(Continued)

OTHER PUBLICATIONS

European Patent Office European Search Report, dated Aug. 19, 2019, for counterpart foreign application No. EP 19159956.2, Applicant The Boeing Company, 4 pages.

(Continued)

*Primary Examiner* — Thomas C Diaz

(57) ABSTRACT

There is provided a robotic end effector assembly having a base configured to be connected to a robot. The base includes a robot adapter coupled to a base plate. The robotic end effector assembly further has a spindle support plate positioned substantially parallel with and coupled to the base plate, via two flexure members. The robotic end effector assembly further has a spindle disposed on the spindle support plate. The robotic end effector assembly further has an actuator coupled between the base plate and the spindle support plate. The actuator is configured to engage an actuator mount attached to the spindle support plate, to displace the spindle support plate. The flexure members inhibit an off-axis drilling motion, as the spindle support plate is displaced.

20 Claims, 18 Drawing Sheets

(56) References Cited

U.S. PATENT DOCUMENTS 9,370,827 B2 * 6/2016 Zubin .................... B23B 39/20
2001/0012478 A1 8/2001 Gianni
2009/0313830 A1 12/2009 Bisiach et al.

FOREIGN PATENT DOCUMENTS

| EP | 0383652 A1 | 8/1990 |
|----|------------|--------|
| EP | 2842672 A1 | 3/2015 |
| FR | 2927271 A1 | 8/2009 |
| GB | 775043 A | 5/1957 |
| GB | 2478312 A | 9/2011 |

OTHER PUBLICATIONS

European Patent Office (EPO) Office Action Communication, dated Sep. 4, 2019, for counterpart foreign application No. EP 19159956.2, Applicant The Boeing Company, 7 pages.

* cited by examiner

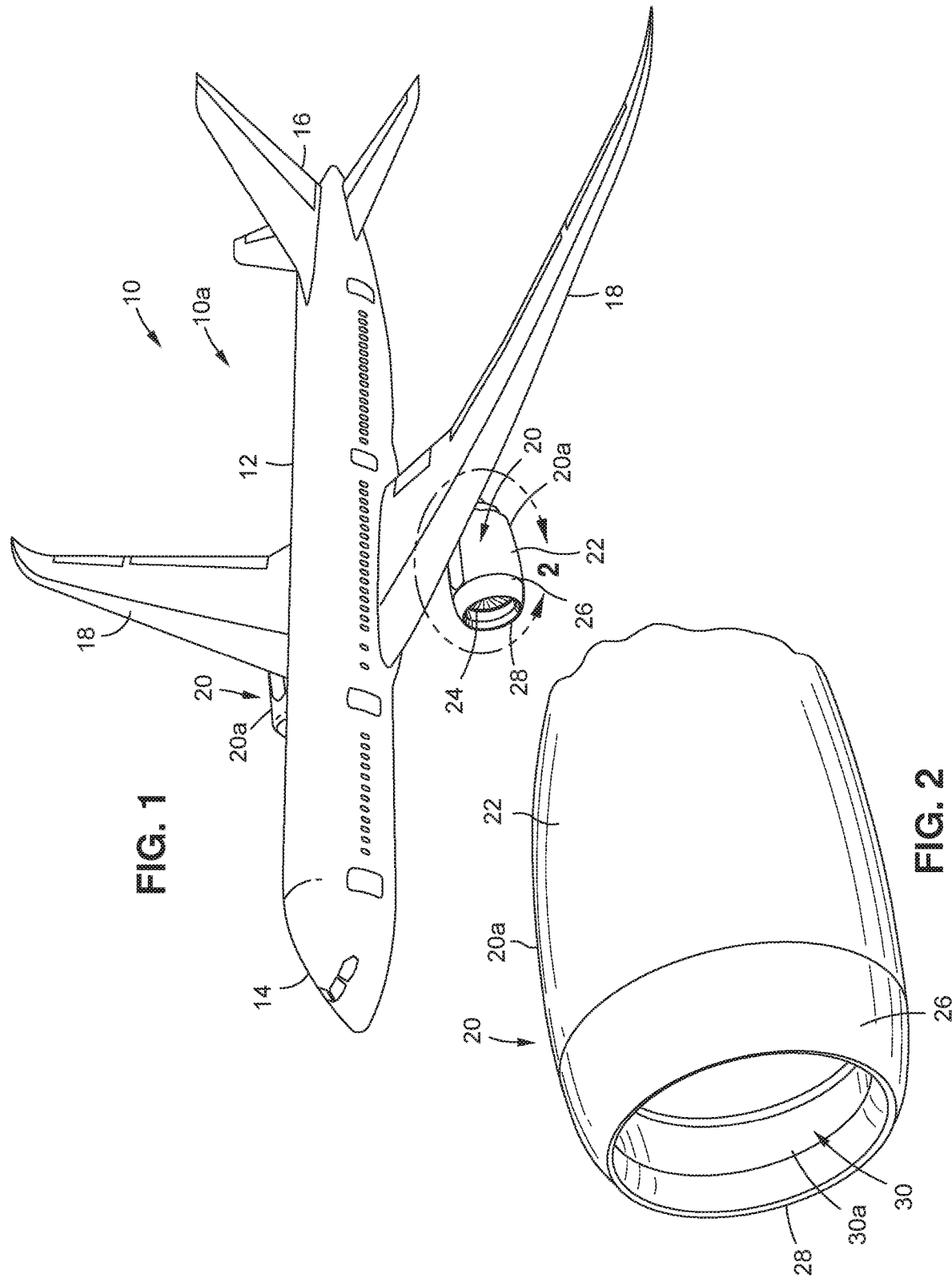

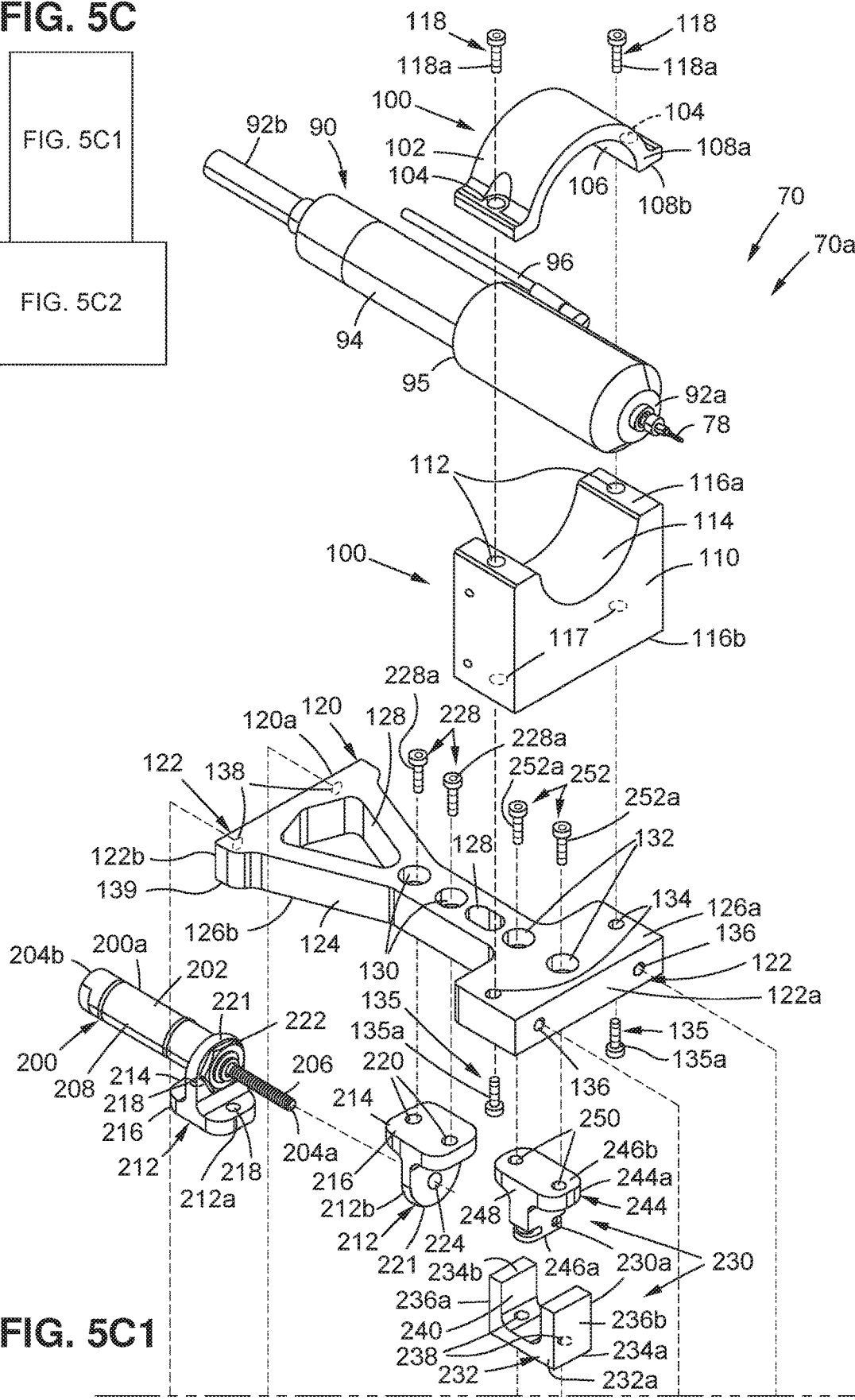

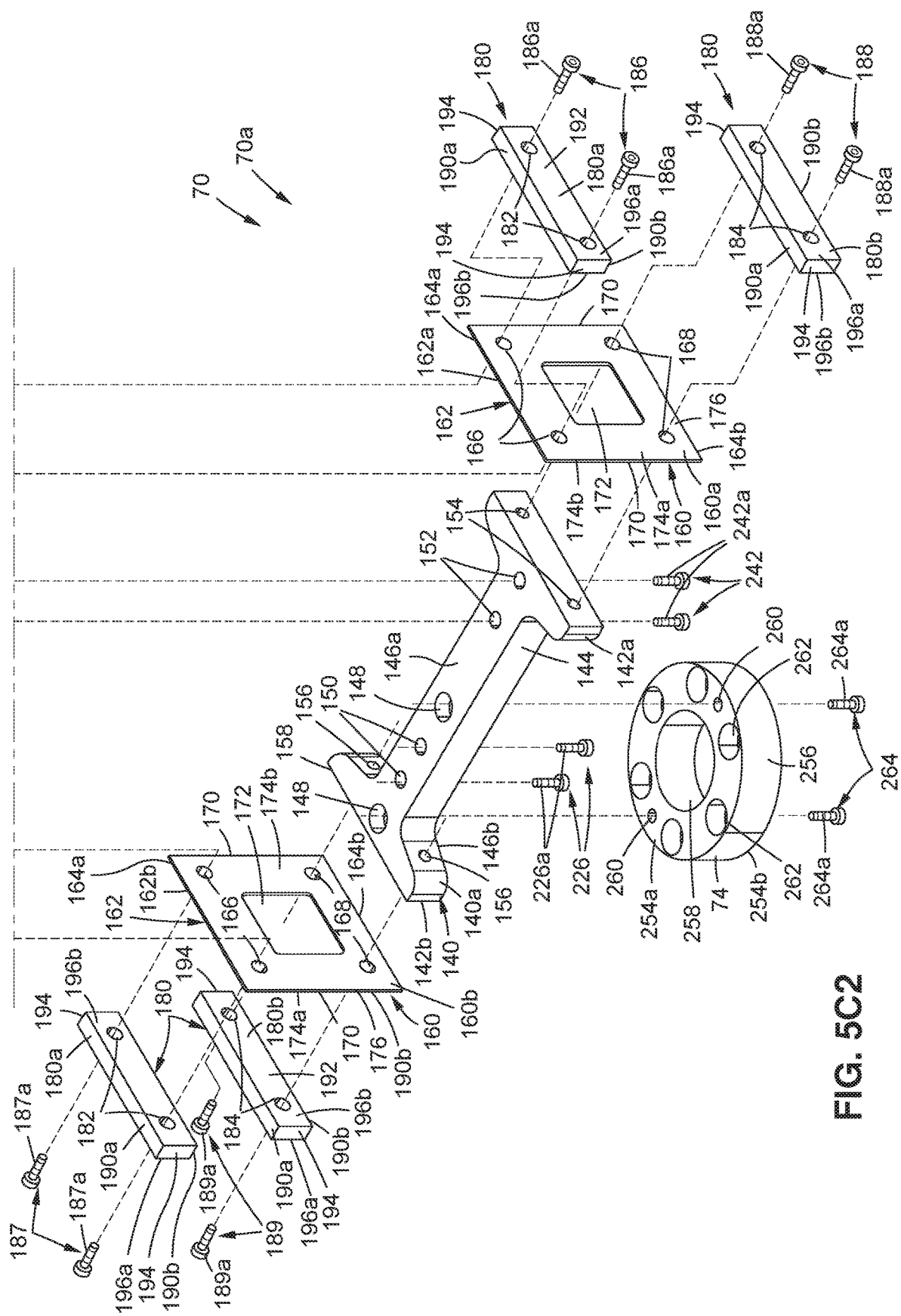

US 10,675,768 B2

ROBOTIC END EFFECTOR ASSEMBLY, SYSTEM, AND METHOD OF USING THE SAME

BACKGROUND

1) Field of the Disclosure

The disclosure relates generally to robotic end effectors, and more particularly, to robotic end effectors for robotic spindle drilling to perforate acoustic surfaces of structures.

2) Description of Related Art

Commercial airliners are required to meet certain noise standards such as during takeoff and landing. A large portion of the noise produced by a commercial airliner during takeoff and landing is generated by gas turbine engines commonly used on airliners. Known systems and methods for reducing the noise level of a gas turbine engine include acoustically treating the engine inlet of the engine nacelle. In this regard, the inner barrel section of a gas turbine engine inlet may be provided with a plurality of relatively small perforations formed in the walls of the inner barrel section. The perforations absorb some of the noise that is generated by fan blades rotating at high speed at the engine inlet, and thereby reduce the overall noise output of the gas turbine engine.

Known systems and methods for forming perforations in acoustic structures, such as the inner barrel sections of a gas turbine engine inlet, may include the use of robotic arms and dedicated drilling machines. The use of robotic arms may rely on a coordinated robot movement to produce straight drilling motion. However, any slight friction, stiction (i.e., static friction), or backlash when the robot reverses axes may cause a drill or a cutter to deviate from a drill path or a cutting path and enlarge a hole or a slot on entry (e.g., deviation or "wiggle" formed in the hole or slot on entry of the spindle drill into the material being drilled), and enlarge a hole or a slot on exit (e.g., deviation or "eyebrow" edge formed in the hole or slot on exit of the spindle drill from the material being drilled). This may cause stress and fatigue issues.

In addition, another known system and method involves robotic spindle drilling to robotically drill perforations into structures, such as inner barrel sections. However, such known robotic spindle drilling system and method may be susceptible to spindle movement that may result in off-axis drilling issues or deviations from the drill path that may cause "out-of-round" holes.

Another known design exists using small linear rails that slide back and forth to allow a linear motion of a robot. However, such sliding rails may experience increased wear over a short period of time, may produce unwanted debris due to friction of the sliding parts, and may increase the overall weight of the system.

As can be seen, there exists a need in the art for a system and method that provide a straight drilling motion for drilling perforations, holes, or slots in an acoustic structure, that minimize or eliminate the occurrence of spindle movement and deviations on entry and exit out of drilled perforations, holes, or slots, that avoid the use of sliding parts, and that provide advantages over known systems and methods.

SUMMARY

The above-noted needs associated with drilling perforations, holes, or slots in acoustic structures are specifically addressed and alleviated by the present disclosure which provides, in one version, a robotic end effector assembly. The robotic end effector assembly comprises a base configured to be connected to a robot. The base comprises a robot adapter coupled to a base plate. The robotic end effector assembly further comprises a spindle support plate positioned substantially parallel with and coupled to the base plate, via two flexure members. The robotic end effector assembly further comprises a spindle disposed on the spindle support plate. The robotic end effector assembly further comprises an actuator coupled between the base plate and the spindle support plate. The actuator is configured to engage an actuator mount attached to the spindle support plate, to displace the spindle support plate. The flexure members inhibit an off-axis drilling motion, as the spindle support plate is displaced.

In another version there is provided a drilling system. The drilling system comprises a robot comprising a robotic drilling unit having a robotic end effector attachment portion. The drilling system further comprises a robotic end effector assembly attached to the robot. The robotic end effector assembly comprises a base attached to the robotic end effector attachment portion. The base comprises a robot adapter coupled to a base plate. The robotic end effector assembly further comprises a spindle support plate positioned substantially parallel with and coupled to the base plate, via two flexure plates, each comprised of a flexible material.

The robotic end effector assembly further comprises a spindle coupled to the spindle support plate, via a spindle clamp attached to the spindle support plate. The robotic end effector assembly further comprises a linear actuator coupled between the base plate and the spindle support plate. The linear actuator is attached to the base plate, via a first actuator mount, and the linear actuator configured to engage a second actuator mount attached to the spindle support plate, to displace the spindle support plate. The drilling system further comprises a structure comprising a workpiece positioned opposite the spindle of the robotic end effector assembly. The spindle is configured to perform a drilling operation on the structure. The flexure plates maintain an alignment of the spindle along an axis of the spindle. The flexure plates also inhibit an off-axis spindle drilling motion, as the spindle support plate is displaced.

In another version there is provided a method of using a robotic end effector assembly to perform a drilling operation on a structure. The method comprises the step of assembling a robotic end effector assembly. The robotic end effector assembly comprises a base comprising a robot adapter coupled to a base plate. The robotic end effector assembly further comprises a spindle support plate positioned substantially parallel with and coupled to the base plate, via two flexure members. The robotic end effector assembly further comprises a spindle coupled to the spindle support plate, via a spindle clamp attached to the spindle support plate. The robotic end effector assembly further comprises an actuator coupled between the base plate and the spindle support plate. The actuator is attached to the base plate, via a first actuator mount.

The method further comprises the step of attaching the robotic end effector assembly to a robot comprising a robotic drilling unit. The method further comprises the step of positioning the robotic end effector assembly opposite the structure to be drilled, so that the spindle faces the structure. The method further comprises the step of actuating the actuator to engage a second actuator mount attached to the spindle support plate, to displace the spindle support plate.

The method further comprises the step of contacting a surface of the structure with the spindle to perform the drilling operation, and deflecting the two flexure members by a force of the actuator. The method further comprises the step of inhibiting an off-axis drilling motion, as the spindle support plate is displaced, and maintaining, with the flexure members, an alignment of the spindle normal to the surface of the structure.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions or embodiments, but which are not necessarily drawn to scale, wherein:

FIG. 1 is an illustration of a perspective view of an aircraft;

FIG. 2 is an illustration of a perspective view of a nacelle of an engine of the aircraft of FIG. 1;

FIG. 5C is an illustration showing a box diagram arrangement of FIG. 5C1 and FIG. 5C2;

FIG. 5C1 is an illustration of a first partial exploded front perspective view of the robotic end effector assembly of FIG. 5B;

FIG. 5C2 is an illustration of a second partial exploded front perspective view of the robotic end effector assembly of FIG. 5B;

Figure 3A:
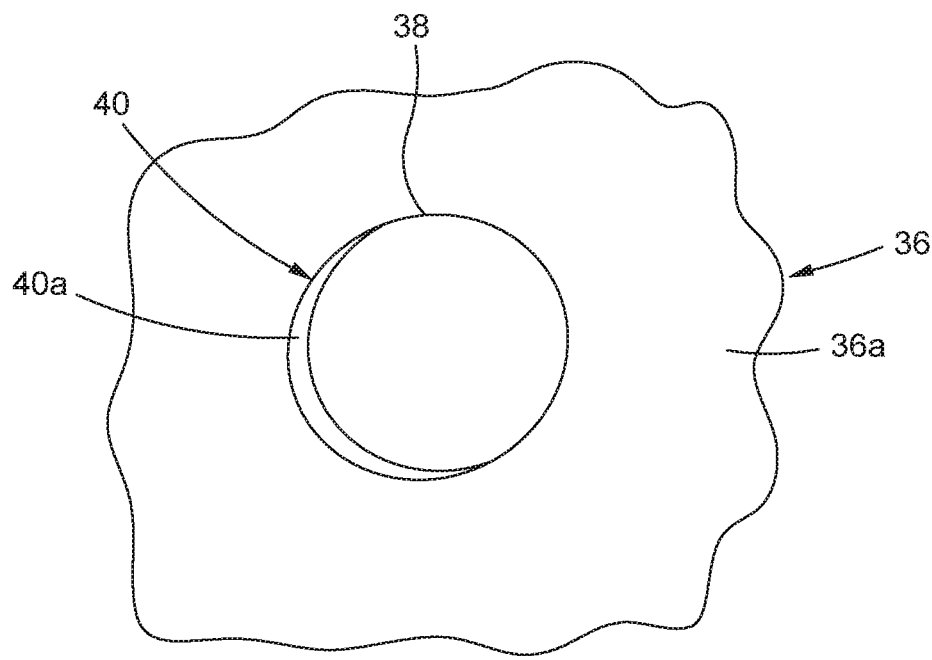
FIG. 3A is an illustration of a front view of a known part having a drilled hole with an eyebrow edge.

Each figure shown in this disclosure shows a variation of an aspect of the versions or embodiments presented, and only differences will be discussed in detail.

DETAILED DESCRIPTION

Disclosed versions or embodiments will now be described more fully hereinafter with reference to the accompanying drawings, in which some, but not all of the disclosed versions or embodiments are shown. Indeed, several different versions may be provided and should not be construed as limited to the versions set forth herein. Rather, these versions are provided so that this disclosure will be thorough and fully convey the scope of the disclosure to those skilled in the art.

Now referring to the Figures, FIG. 1 is an illustration of a perspective view of a vehicle 10, such as in the form of an aircraft 10a. As shown in FIG. 1, the vehicle 10, such as in the form of aircraft 10a, comprises a fuselage 12, a nose 14, a tail 16, a pair of wings 18, and engines 20, such as gas turbine engines 20a. As further shown in FIG. 1, each engine 20 is encased with a nacelle 22, and each engine 20 has a fan 24. As further shown in FIG. 1, each nacelle 22 includes a fan cowl 26. As further shown in FIG. 1, each engine 20 has an engine inlet 28.

Now referring to FIG. 2, FIG. 2 is an illustration of a perspective view of the nacelle 22 of the engine 20, such as the gas turbine engine 20a, of the aircraft 10a of FIG. 1. FIG. 2 shows the engine 20 with the fan cowl 26 and the engine inlet 28. As shown in FIG. 2, the engine inlet 28 includes a structure 30, such as an inner barrel section 30a, that may be configured to serve as an acoustic structure 30b (see FIG. 10) having a plurality of perforations 82 (see FIG. 4) for absorbing noise generated by the rotating fans 24 (see FIG. 1) and/or noise generated by the airflow entering the engine inlet and passing through the engine 20, such as the gas turbine engine 20a.

Now referring to FIG. 3A, FIG. 3A is an illustration of a front view of a known structure 36, such as a known part section 36a having a drilled hole 38. An off-axis drilling motion 300 (see FIG. 10), such as an off-axis spindle drilling motion 300a (see FIG. 10), may create an irregularity 40 (see FIG. 3A) that is undesirable, such as in the form of an eyebrow edge 40a (see FIG. 3A) on the drilled hole 38 (see FIG. 3A).

Figure 3B:
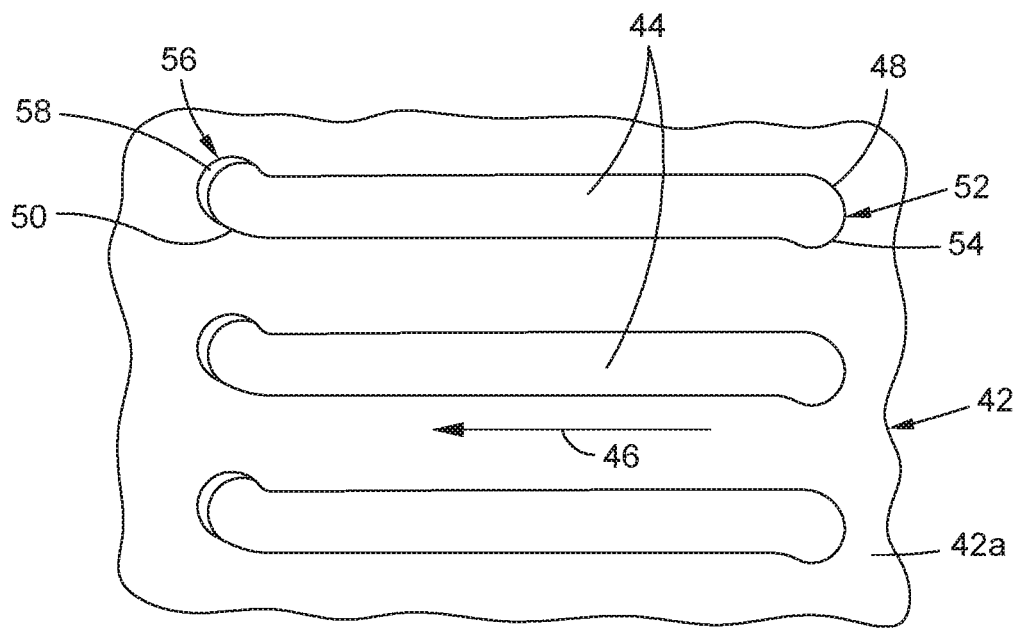
FIG. 3B is an illustration of a front view of a known panel section having drilled slots with drill path deviations.

Now referring to FIG. 3B, FIG. 3B is an illustration of a front view of a known structure 42, such as a known panel section 42a, having drilled slots 44. As shown in FIG. 3B, the drilled slots 44 include a drill entrance end 48 and a drill exit end 50, and the drilled slots 44 may be formed when a known spindle drill moves in a drill path direction 46 from the drill entrance end 48 to the drill exit end 50. An off-axis drilling motion 300 (see FIG. 10), such as an off-axis spindle drilling motion 300a (see FIG. 10), of the drilled slots 44 (see FIG. 3B) may create drill path deviations 52, 56 (see FIG. 3B) that are undesirable, such as an entrance hook formation 54 (see FIG. 3B) and an exit hook formation 58 (see FIG. 3B).

Figure 4:
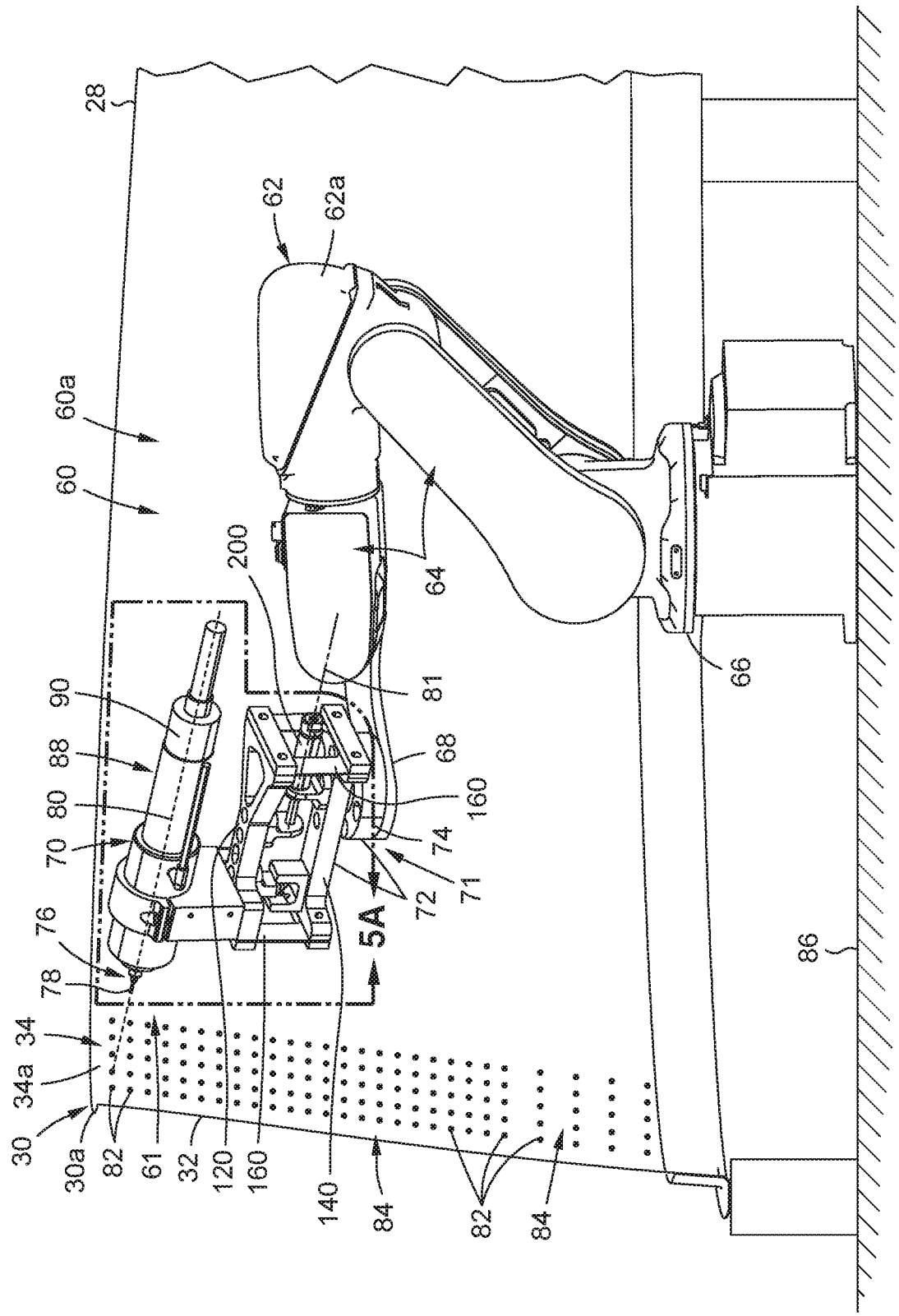
FIG. 4 is an illustration of a perspective side view of a version of a drilling system of the disclosure having a robotic end effector assembly forming a plurality of perforations in a structure.

Now referring to FIG. 4, FIG. 4 is an illustration of a perspective side view of a version of a drilling system 60 of the disclosure. The drilling system 60 (see FIG. 4) preferably comprises a robotic drilling system 60a (see FIG. 4), or another suitable drilling system 60. The drilling system 60 (see FIG. 4), such as the robotic drilling system 60a (see FIG. 4), is designed to perform a drilling operation 61 (see FIG. 10) on a structure 30 (see FIG. 4). The drilling operation 61 (see FIG. 10) may include drilling 61a (see FIG. 10), spindle drilling 61b (see FIG. 10), perforating 61c (see FIG. 10), slotting 61d (see FIG. 10), cutting 61e (see FIG. 10), milling 61f (see FIG. 10), or another suitable drilling operation 61 that involves removing material from a structure 30 (see FIG. 4) being operated or drilled on. The robotic end effector assembly 70 of the drilling system 60 disclosed herein is particularly suited for drilling operations 61 to acoustically treat surfaces or rapidly perforate a sheet of material.

As shown in FIG. 4, the structure 30 may comprise the inner barrel section 30a, for example, such as in the form of a workpiece 32. The structure 30 (see FIG. 4) may comprise an acoustic structure 30b (see FIG. 10), a panel 30c (see FIG. 10), or another suitable structure 30 that the drilling operation 61 (see FIG. 10) may be performed on and that is preferably thin-walled. Preferably, the robotic end effector assembly 70 (see FIG. 4) is a flexure based robotic end effector assembly 70a (see FIGS. 5A, 10) designed to allow short motion along an axis 80 (see FIG. 4) of a spindle 90 (see FIG. 4) for drilling 61a (see FIG. 10), spindle drilling 61b (see FIG. 10), perforating 61c (see FIG. 10), slotting 61d (see FIG. 10), cutting 61e (see FIG. 10), or milling 61f (see FIG. 10) the inner barrel sections 30a (see FIG. 4), acoustic structures 30b (see FIG. 10), panels 30c (see FIG. 10), face sheets, or other suitable thin-walled structures.

As shown in FIG. 4, the drilling system 60, such as the robotic drilling system 60a, comprises a robot 62. As further shown in FIG. 4, the robot 62 may comprise a robotic drilling unit 62a having a robotic arm assembly 64, a robotic drilling unit base 66 attached to a lower or base end of the robotic arm assembly 64, and a robotic end effector attachment portion 68 attached to an upper end of the robotic arm assembly 64. The drilling system 60, such as the robotic drilling system 60a, may be attached to a system base 86 (see FIG. 4).

As shown in FIG. 4, the drilling system 60, such as the robotic drilling system 60a, further comprises a robotic end effector assembly 70 attached to the robot 62. As shown in FIG. 4, the robotic end effector assembly 70 has a first end 71 and a second end 76. At the first end 71, the robotic end effector assembly 70 comprises a base 72 that includes a robot adapter 74 (see FIG. 4) attached to the robotic end effector attachment portion 68, and that includes a base plate 140 (see FIG. 5A). At the second end 76, the robotic end effector assembly 70 comprises a tool 88 (see FIG. 4), such as a spindle 90 (see FIG. 4), having a drill bit 78 (see FIG. 4) at the end of the tool 88, such as the spindle 90. The structure 30, such as in the form of the workpiece 32, is shown positioned opposite the drill bit 78 and the spindle 90 of the robotic end effector assembly 70. As shown in FIG. 4, the robotic end effector assembly 70 further comprises a spindle support plate 120 positioned substantially parallel with, and coupled to, the base plate 140, via two flexure members 160. As shown in FIG. 4, the robotic end effector assembly 70 further comprises an actuator 200 positioned and coupled between the spindle support plate 120 and the base plate 140. The spindle 90 (see FIG. 4) has an axis 80 (see FIG. 4), and the actuator 200 (see FIG. 4) has an axis 81 (see FIG. 4). The actuator 200 is positioned such that the axis 80 of the spindle 90 is substantially parallel to the axis 81 of the actuator 200. As used herein, "robotic end effector assembly" means a device or tool that is connected to the end of a robot arm where the hand would be, and is the part of the robot that interacts with the environment, such as drilling the structure or workpiece.

As shown in FIG. 4, the spindle 90 with the drill bit 78 of the robotic end effector assembly 70 forms or drills, or is configured to form or drill, a plurality of perforations 82 that may have predetermined hole patterns 84 along a surface 34 of the structure 30, such as the inner barrel section 30a, for example, such as in the form of workpiece 32. The surface 34 (see FIG. 4) may comprise an acoustic surface 34a (see FIG. 4) or another suitable surface 34. During the design and/or development of the aircraft 10a (see FIG. 1), the predetermined hole patterns 84 (see FIG. 4) for the perforations 82 (see FIG. 4) may be selected for the structure 30, such as the inner barrel section 30a (see FIG. 4), to meet acoustic performance requirements of the engine inlet 28 (see FIGS. 1, 4).

The robot 62 (see FIG. 4), such as the robotic drilling unit 62a (see FIG. 4), may be operated and/or programmed in a manner to drill the plurality of perforations 82 (see FIG. 4) in the structure 30 (see FIG. 4), such as the inner barrel section 30a (see FIG. 4), for example, the workpiece 32 (see FIG. 4). The robotic arm assembly 64 (see FIG. 4) of the robot 62, such as the robotic drilling unit 62a, may comprise a six-axis robotic arm assembly which may allow for accurately positioning the robotic end effector assembly 70 at any desired location and orientation along the surface 34 (see FIG. 4) of the structure 30, such as the inner barrel section 30a, for example, the workpiece 32. The robotic arm assembly 64 may also be provided in alternative arrangements. For example, the robotic arm assembly 64 may be provided in a 3-axis embodiment (not shown), a 4-axis embodiment (not shown), or a 5-axis embodiment (not shown). In addition, the robotic arm assembly 64 may be provided in an embodiment having more than six (6) axes. Furthermore, the robotic arm assembly 64 may be configured as a motion control system (not shown), a rigid frame (not shown) having linear axes along which the end effector is movable, or any other type of motion control device for controlling the robotic end effector assembly 70 for drilling the perforations 82. In addition, each robotic end effector assembly 70 may have more than one drill bit 78 for simultaneously forming perforations 82.]

As the robotic end effector assembly 70 (see FIG. 4) is positioned and oriented at a desired location of a perforation 82, the robotic end effector assembly 70 may be moved axially to drive the rotating drill bit 78 into the surface 34 of the structure 30, such as the inner barrel section 30a, for example, the workpiece 32, to form a perforation 82. Alternatively, the robotic end effector assembly 70 may be positioned at a desired location of a perforation 82 on the surface 34 of the structure 30, and the robotic end effector assembly 70 may axially drive the rotating drill bit 78 along a direction of an axis 80 of the spindle 90 to drill the perforation 82 in the surface 34 of the structure 30. The robotic end effector assembly 70 is preferably configured to linearly translate the drill bit 78 along the axis 80 of the spindle 90, such as when drilling a perforation 82 in the surface 34 of the structure 30.

Figure 5A:
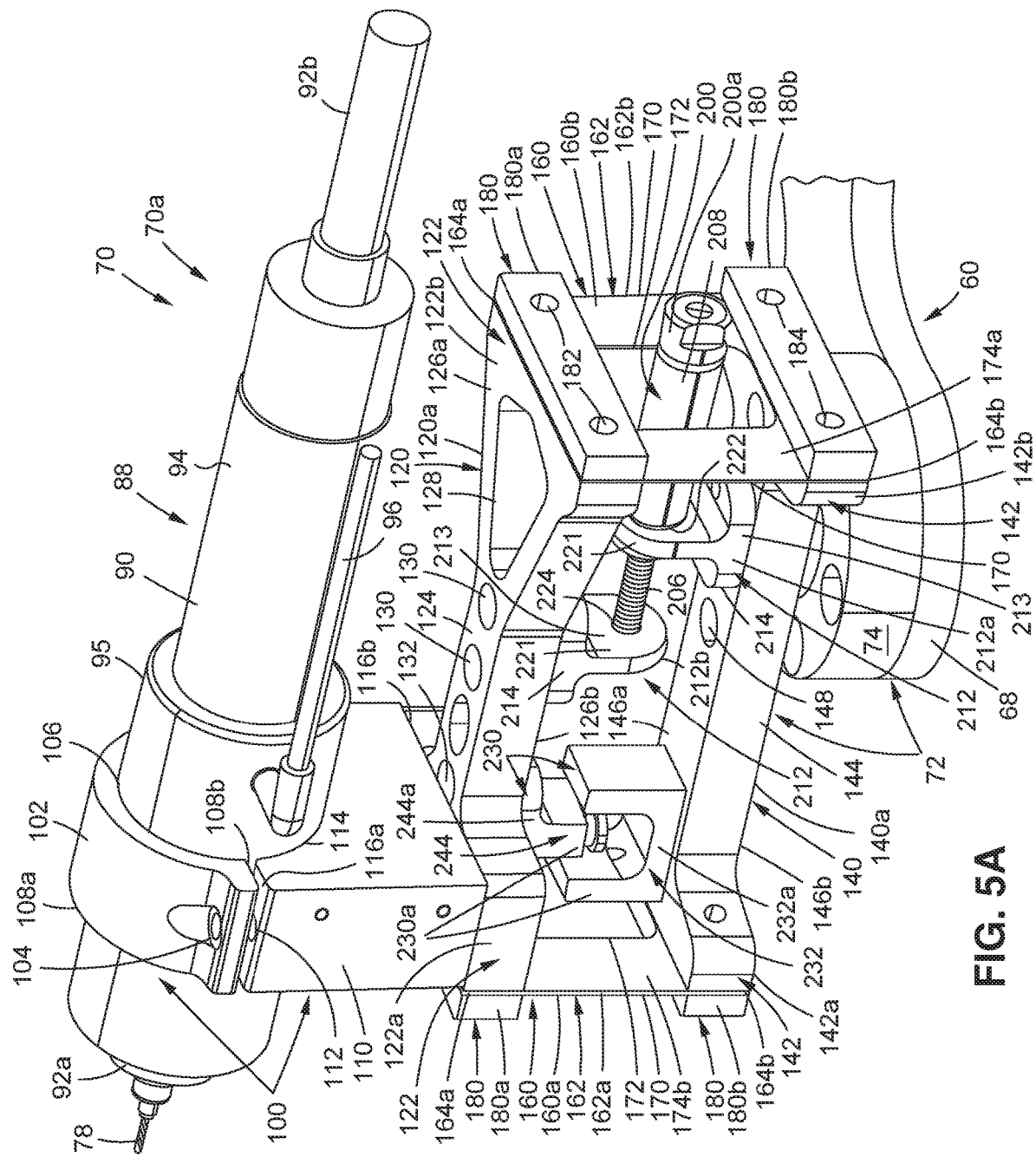
FIG. 5A is an illustration of a back perspective view of a version of the robotic end effector assembly of the disclosure.
Figure 5B:
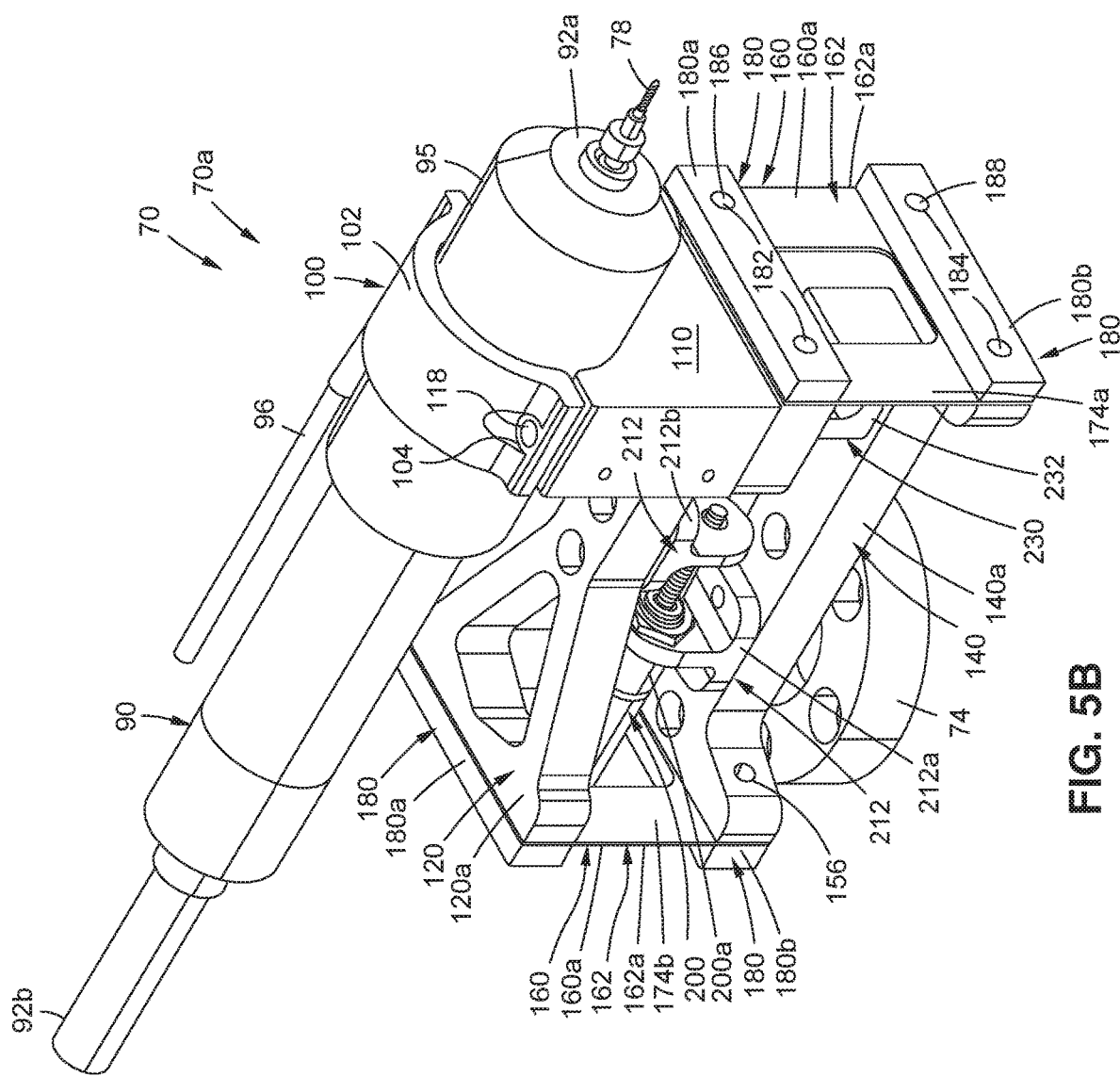
FIG. 5B is an illustration of a front perspective view of the robotic end effector assembly of FIG. 5A.

Now referring to FIGS. 5A-5F, in one version there is provided the robotic end effector assembly 70, such as in the form of flexure based robotic end effector assembly 70a. FIG. 5A is an illustration of a back perspective view of a version of the robotic end effector assembly 70, such as the flexure based robotic end effector assembly 70a, of the disclosure. FIG. 5B is an illustration of a front perspective view of the robotic end effector assembly 70 of FIG. 5A.

Figure 5D:
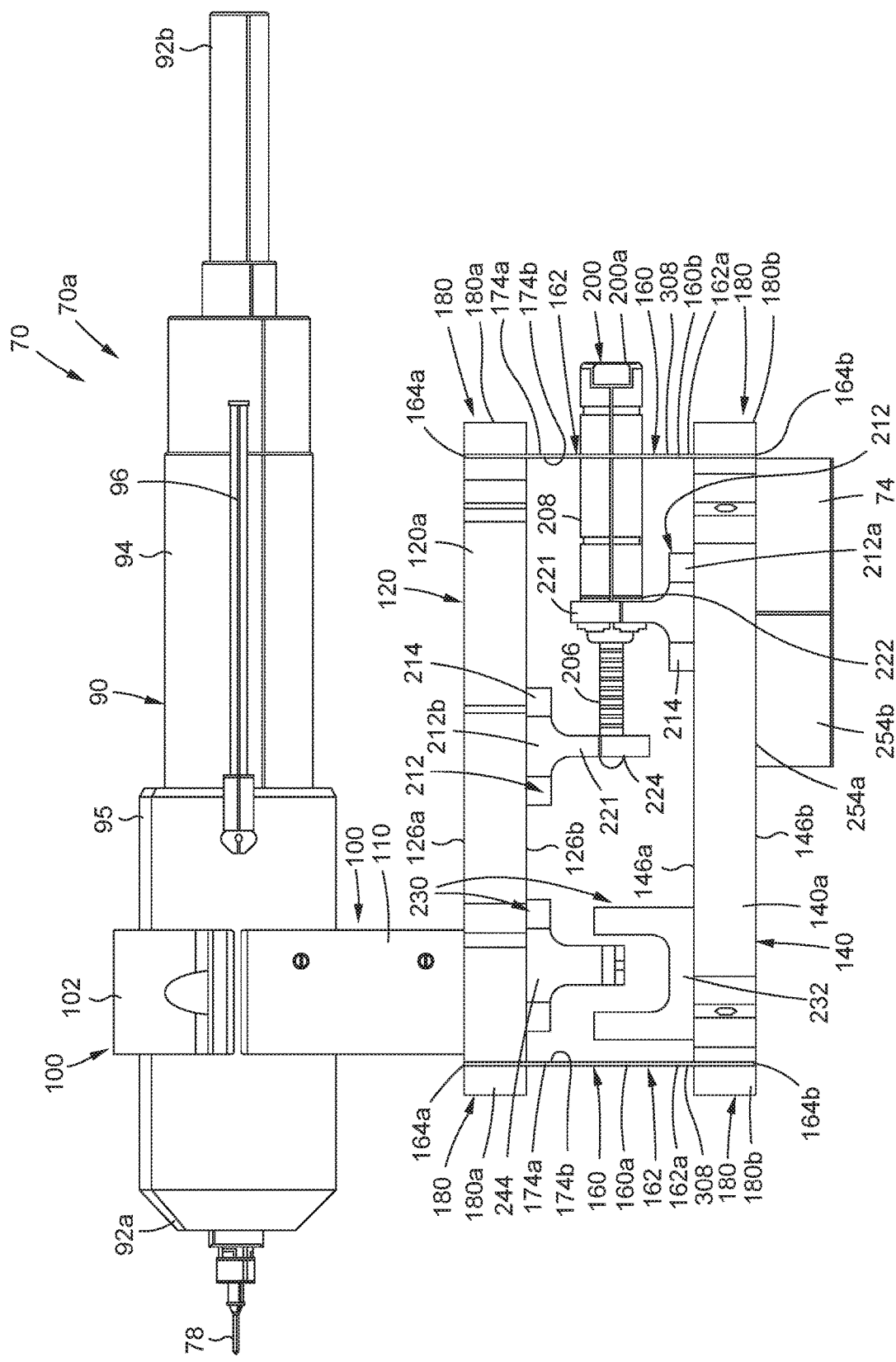
FIG. 5D is an illustration of a left side view of the robotic end effector assembly of FIG. 5A.
Figure 5E:
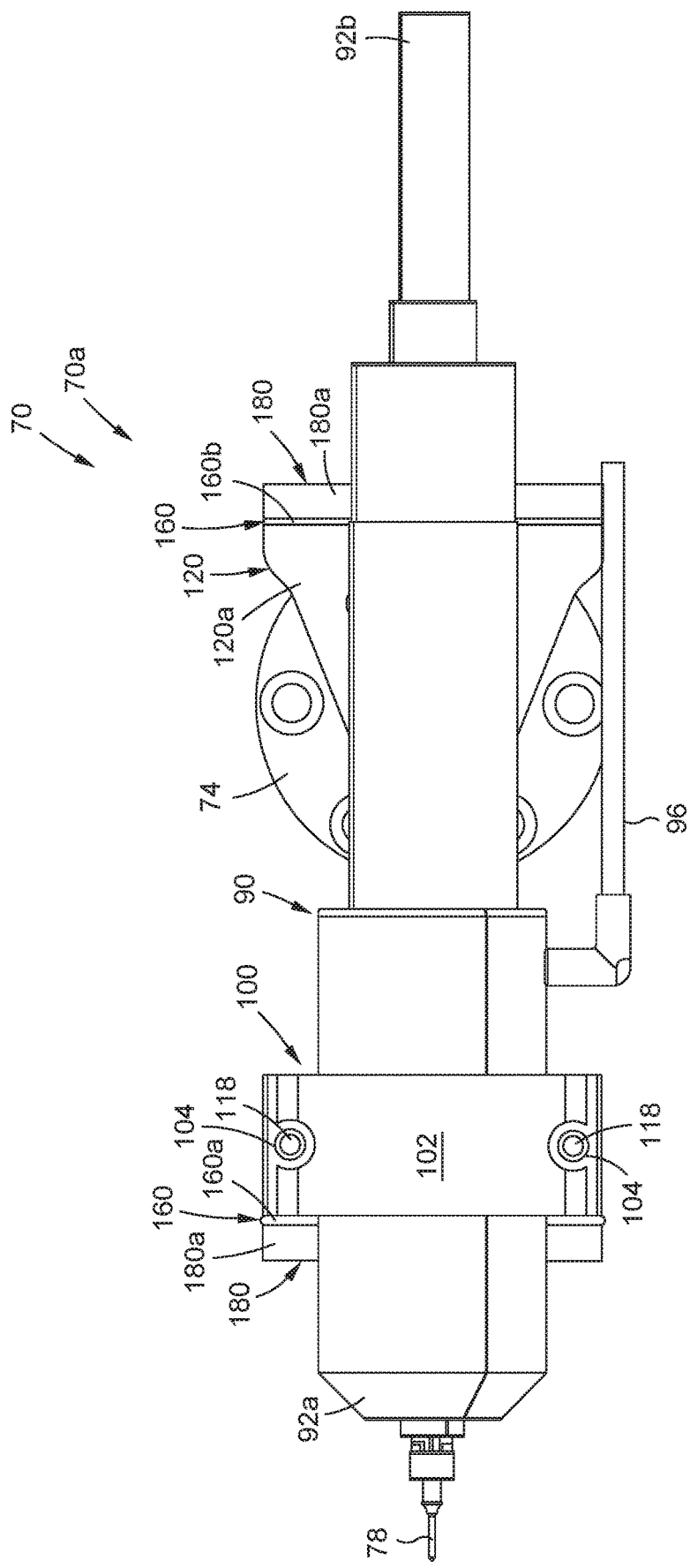
FIG. 5E is an illustration of a top view of the robotic end effector assembly of FIG. 5A.
Figure 5F:
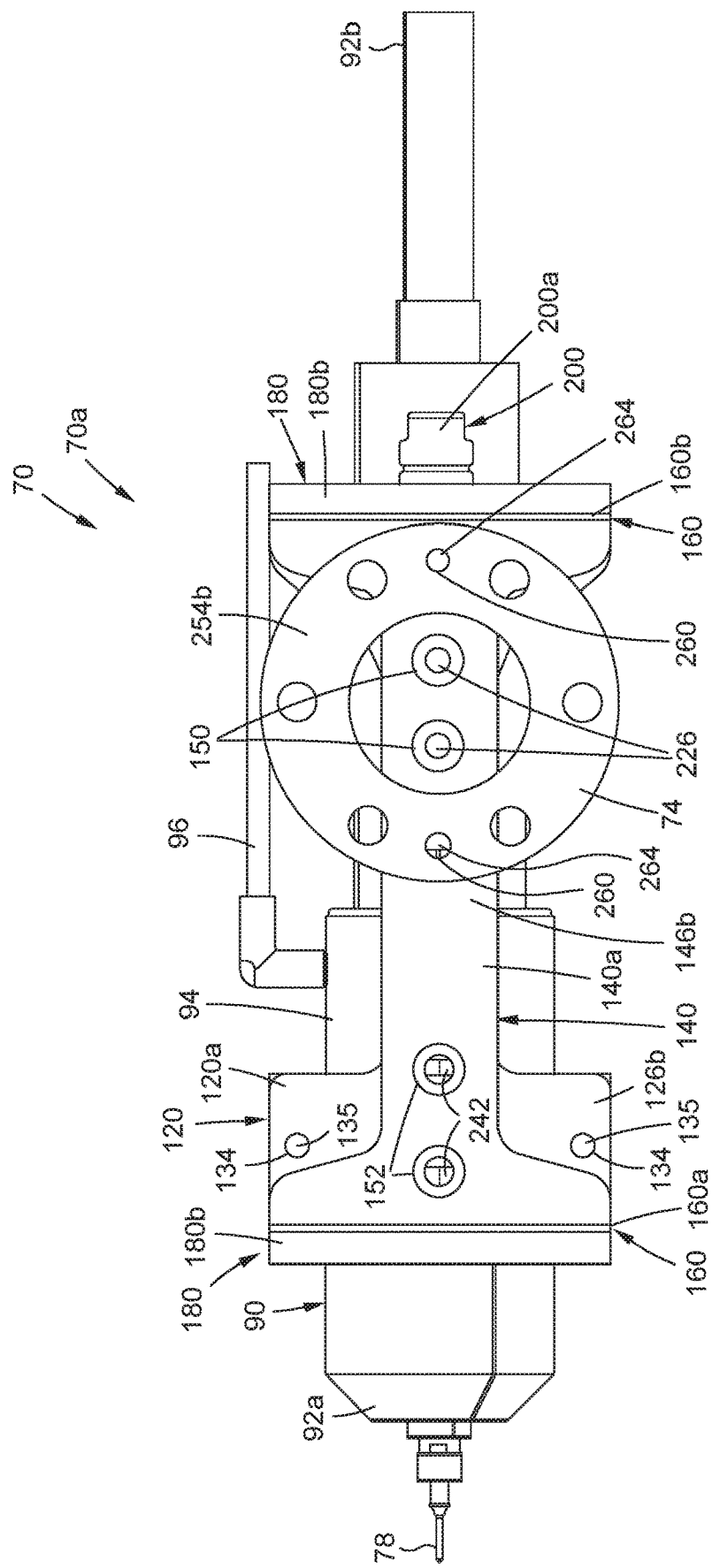
FIG. 5F is an illustration of a bottom view of the robotic end effector assembly of FIG. 5A.

FIG. 5C is an illustration showing a box diagram arrangement of FIG. 5C1 and FIG. 5C2, where FIG. 5C1 is an illustration of a first partial exploded front perspective view of the robotic end effector assembly 70 of FIG. 5B, and FIG. 5C2 is an illustration of a second partial exploded front perspective view of the robotic end effector assembly 70 of FIG. 5B. FIG. 5D is an illustration of a left side view of the robotic end effector assembly 70 of FIG. 5A. FIG. 5E is an illustration of a top view of the robotic end effector assembly 70 of FIG. 5A. FIG. 5F is an illustration of a bottom view of the robotic end effector assembly 70 of FIG. 5A.

The robotic end effector assembly 70 (see FIGS. 5A-5F), such as in the form of flexure based robotic end effector assembly 70a (see FIGS. 5A-5F), comprises the tool 88 (see FIG. 5A), such as in the form of spindle 90 (see FIGS. 5A-5C1, 5D-5F). The spindle 90 may comprise a motor driven spindle 90a (see FIG. 10), a hydraulic driven spindle 90b (see FIG. 10), a pneumatically driven spindle 90c (see FIG. 10), or another suitable spindle 90. The spindle 90 may be powered with a spindle power source 98 (see FIG. 10) comprising an electric power source 98a (see FIG. 10), a hydraulic power source 98b (see FIG. 10), a pneumatic power source 98c (see FIG. 10), or another suitable spindle power source 98.

The spindle 90 (see FIGS. 5A-5C1, 5D-5F) has a first end 92a (see FIGS. 5A-5C1, 5D-5F), a second end 92b (see FIGS. 5A-5C1, 5D-5F), and a body 94 (see FIGS. 5A, 5C1, 5D, 5F) formed between the first end 92a and the second end 92b, where the body 94 has a cylindrical configuration 95 (see FIGS. 5A-5C1, 5D). A side attachment element 96 (see FIGS. 5A-5C1, 5D-5F) is attached or coupled to the spindle 90.

The spindle 90 is clamped or held in place with a spindle clamp 100 (see FIGS. 5A-5C1, 5D-5E). The spindle clamp 100 comprises a first portion 102 (see FIGS. 5A-5C1, 5D-5E) attached, or configured to be attached, to a second portion 110 (see FIGS. 5A-5C1, 5D). The first portion 102 comprises attachment openings 104 (see FIGS. 5A-5C1, 5E). Each attachment opening 104 receives, or is configured to receive, an attachment element 118 (see FIGS. 5C1, 5E), such as in the form of a bolt 118a (see FIG. 5C1), or another suitable attachment element 118. The first portion 102 has a curved configuration 106 (see FIGS. 5A, 5C1) that conforms to the cylindrical configuration 95 of the spindle 90, so that when the first portion 102 and the second portion 110 are attached together, they snugly clamp around the exterior of the spindle 90 to secure the spindle 90 in place. As shown in FIGS. 5A and 5C1, the first portion 102 has a top side 108a and a bottom side 108b.

The second portion 110 of the spindle clamp 100 comprises a top side 116a (see FIGS. 5A, 5C1) with attachment openings 112 (see FIG. 5C1) formed in the top side 116a (see FIGS. 5A, 5C1). The attachment openings 112 of the second portion 110 correspond to the attachment openings 104 of the first portion 102, and each attachment opening 112 receives, or is configured to receive, the attachment element 118 (see FIG. 5C1), such as in the form of a bolt 118a (see FIG. 5C1), or another suitable attachment element 118. The second portion 110 has a curved interior configuration 114 (see FIGS. 5A, 5C1) that conforms to the cylindrical configuration 95 of the spindle 90, so that when the first portion 102 and the second portion 110 are attached together, they snugly clamp around the exterior of the spindle 90 to secure the spindle 90 in place. The shape of the second portion 110 is substantially in the form of a block and has the curved interior configuration 114 at the top side 116a. The second portion 110 further comprises a bottom side 116b (see FIGS. 5A, 5C1) with attachment openings 117 (see FIG. 5C1) formed in the bottom side 116b. As shown in FIG. 5A, when the first portion 102 and the second portion 110 are attached together, the bottom side 108b of the first portion 102 is adjacent the top side 116a of the second portion 110.

The robotic end effector assembly 70 (see FIGS. 5A-5F), such as in the form of flexure based robotic end effector assembly 70a (see FIGS. 5A-5F), further comprises a spindle support plate 120 (see FIGS. 5A-5C1, 5D-5F), such as in the form of an upper motion stage plate 120a (see FIGS. 5A-5C1, 5D-5F). As shown in FIG. 5A, the tool 88, such as in the form of spindle 90, is coupled to the spindle support plate 120, via the spindle clamp 100, which is directly attached to the spindle support plate 120.

The spindle support plate 120 comprises opposite ends 122 (see FIGS. 5A, 5C1), including a first end 122a (see FIGS. 5A, 5C1) and a second end 122b (see FIGS. 5A, 5C1). The spindle support plate 120 further comprises a body 124 (see FIGS. 5A, 5C1) having a first upper side 126a (see FIGS. 5A, 5C1, 5D) and a second lower side 126b (see FIGS. 5A, 5C1, 5D, 5F). The spindle support plate 120 may have one or more cut-out portions 128 (see FIGS. 5A, 5C1) formed through the body 124. As shown in FIGS. 5A and 5C1, the spindle support plate 120 may further have first attachment through openings 130 and second attachment through openings 132. Each first attachment through opening 130 receives, or is configured to receive, an attachment element 228 (see FIG. 5C1), such as in the form of a bolt 228a (see FIG. 5C1), or another suitable attachment element 228. Each second attachment through opening 132 receives, or is configured to receive, an attachment element 252 (see FIG. 5C1), such as in the form of a bolt 252a (see FIG. 5C1), or another suitable attachment element 252.

As shown in FIGS. 5C1 and 5F, the spindle support plate 120 may further comprise spindle clamp attachment through openings 134 formed through a portion of the body 124 (see FIG. 5C1) near the first end 122a (see FIG. 5C1). Each spindle clamp attachment through opening 134 receives, or is configured to receive, an attachment element 135 (see FIGS. 5C1, 5F), such as in the form of a bolt 135a (see FIG. 5C1), or another suitable attachment element 135, which allows attachment of the spindle support plate 120 to the spindle clamp 100. As shown in FIG. 5C1, the attachment elements 135 are configured to be inserted through the spindle clamp attachment through openings 134 in the spindle support plate 120, and are configured to be further inserted into the attachment openings 117 in the bottom side 116b of the second portion 110 of the spindle clamp 100, to attach the spindle support plate 120 to the spindle clamp 100. In particular, a portion of the first upper side 126a (see FIG. 5C1) of the spindle support plate 120 (see FIG. 5C1) is preferably attached to the bottom side 116b (see FIG. 5C1) of the second portion 110 (see FIG. 5C1) of the spindle clamp 100 (see FIG. 5C1). However, the spindle support plate 120 may be coupled or attached to the spindle clamp 100 in another suitable location by another suitable mechanism or device.

As shown in FIG. 5C1, the spindle support plate 120 may further comprise first end attachment openings 136 formed in the first end 122a, and second end attachment openings 138 formed in the second end 122b. As shown in FIG. 5C1, the spindle support plate 120 may have a Y-shaped configuration 139. However, the spindle support plate 120 may be shaped in other suitable configurations.

The robotic end effector assembly 70 (see FIGS. 5A-5F), such as in the form of flexure based robotic end effector assembly 70a (see FIGS. 5A-5F), further comprises a base plate 140 (see FIGS. 5A-5B, 5C2, 5D, 5F), such as in the form of a lower motion stage plate 140a (see FIGS. 5A-5B, 5C2, 5D, 5F). The base plate 140 comprises opposite ends 142 (see FIG. 5A), including a first end 142a (see FIGS. 5A, 5C2) and a second end 142b (see FIGS. 5A, 5C2). The base plate 140 further comprises a body 144 (see FIGS. 5A, 5C2) having a first upper side 146a (see FIGS. 5A, 5C2, 5D) and a second lower side 146b (see FIGS. 5A, 5C2, 5D, 5F).

As shown in FIG. 5C2, the base plate 140 has adapter attachment through openings 148 that each receive, or are configured to receive, an attachment element 264, such as in the form of a bolt 264a, or another suitable attachment element 264, to attach the robot adapter 74 (see FIG. 5C2) to the second lower side 146b of the base plate 140. As shown in FIGS. 5C2 and 5F, the base plate 140 further has first attachment through openings 150 that each receive, or are configured to receive, an attachment element 226, such as in the form of a bolt 226a, or another suitable attachment element 226. As further shown in FIGS. 5C2 and 5F, the base plate 140 has second attachment through openings 152 that each receive, or are configured to receive, an attachment element 242, such as in the form of a bolt 242a, or another suitable attachment element 242. As shown in FIG. 5C2, the base plate 140 further has first end attachment openings 154 that each receive, or are configured to receive, a second clamp attachment element 188, such as in the form of a bolt 188a, or another suitable attachment element. As shown in FIGS. 5B, 5C2, the base plate 140 further has second end attachment openings 156 that each receive, or are configured to receive, a second clamp attachment element 189, such as in the form of a bolt 189a, or another suitable attachment element. As further shown in FIG. 5C2, the base plate 140 may have an I-shaped configuration 158, or another suitable shape or configuration.

The robotic end effector assembly 70 (see FIGS. 5A-5F), such as in the form of flexure based robotic end effector assembly 70a (see FIGS. 5A-5F), further comprises two flexure members 160 (see FIGS. 5A-5B, 5C2-5F), such as in the form of a first flexure member 160a (see FIGS. 5A-5B, 5C2-5F) and a second flexure member 160b (see FIGS. 5A-5B, 5C2-5F), aligned opposite each other in a parallel arrangement 308 (see FIG. 5D). The two flexure members 160 preferably comprise two flexure plates 162 (see FIGS. 5A-5B, 5C2-5D), such as in the form of a first flexure plate 162a (see FIGS. 5A-5B, 5C2-5D) and a second flexure plate 162b (see FIGS. 5A-5B, 5C2-5D), aligned opposite each other in the parallel arrangement 308 (see FIG. 5D).

The flexure members 160, such as in the form of flexure plates 162, are resilient and made of a flexible material 163 (see FIG. 10), such as a spring steel 163a (see FIG. 10), for example, a 0.010 inch thick 1075 spring steel grade. Other grades of spring steel material or spring material may also be used, or another suitable flexible material 163. Preferably the flexible material 163 has a high fatigue life for a given displacement.

Each flexure member 160 comprises a first end 164a (see FIGS. 5A, 5C2, 5D) and a second end 164b (see FIGS. 5A, 5C2, 5D). As shown in FIG. 5C2, the first end 164a of first flexure member 160a has first end attachment through openings 166 that each receive, or are configured to receive, a first clamp attachment element 186, such as in the form of a bolt 186a, or another suitable attachment element, and the first end 164a of second flexure member 160b has first end attachment through openings 166 that each receive, or are configured to receive, a first clamp attachment element 187, such as in the form of a bolt 187a, or another suitable attachment element. As further shown in FIG. 5C2, the second end 164b of first flexure member 160a has second end attachment through openings 168 that each receive, or are configured to receive, a second clamp attachment element 188, such as in the form of a bolt 188a, or another suitable attachment element, and the second end 164b of second flexure member 160b has second end attachment through openings 168 that each receive, or are configured to receive, a second clamp attachment element 189, such as in the form of a bolt 189a, or another suitable attachment element.

Each flexure member 160 further comprises side edges 170 (see FIGS. 5A, 5C2), a central opening 172 (see FIGS. 5A, 5C2), an exterior side 174a (see FIGS. 5A-5B, 5C2-5D), an interior side 174b (see FIGS. 5A-5B, 5C2-5D), and a rectangular-shaped configuration 176 (see FIG. 5C2). The central opening 172 (see FIG. 5A) of the second flexure member 160b (see FIG. 5A) is used for a pass-through or opening for the actuator 200 (see FIG. 5A) to pass through or be inserted through and this reduces the actuation force required to actuate the actuator 200. The two flexure members 160, such as in the form of flexure plates 162, are each preferably of a size 175 (see FIG. 10) that is equal or the same. Each flexure member 160 has a thickness 178 (see FIG. 10) that is preferably equal or the same. For example, where the flexure member 160 is made of a 0.010 inch thick 1075 spring steel grade, each flexure member 160 may have a thickness 178 of 0.010 inches, and a size 175 of about 2.5 inches in width by 2.5 inches in height. When advancing the spindle 90 towards a surface 34 to be drilled, such flexure members 160 may each be deflected about 0.25 inches to 0.375 inches (e.g., in direction, see forward direction 324 in FIG. 9), while maintaining a parallelogram configuration 314 to maintain the alignment 316 of the spindle 90 normal relative to a surface 34 that the spindle 90 performs drilling operations 61 on.

The two flexure members 160 can each deflect together (in parallel) to allow a linear motion 318 (see FIG. 10) of the spindle support plate 120 in a forward direction 328 (see FIG. 9) along the axis 80 (see FIGS. 4, 9) of the spindle 90, so as to allow the spindle support plate 120 to be displaced or moved, and inhibit an off-axis drilling motion 300 (see FIG. 10), such as an off-axis spindle drilling motion 300a (see FIG. 10), as the spindle support plate 120 is displaced.

The robotic end effector assembly 70 (see FIGS. 5A-5F), such as in the form of flexure based robotic end effector assembly 70a (see FIGS. 5A-5F), further comprises clamps 180 (see FIGS. 5A-5B, 5C2-5F) to secure the two flexure members 160 in place. As shown in FIG. 5D, the two flexure members 160 are preferably positioned in a parallel arrangement 308 and secured between the spindle support plate 120 and the base plate 140 with the clamps 180. The clamps 180 may comprise a first clamp 180a (see FIGS. 5A-5B, 5C2-5F) and a second clamp 180b (see FIGS. 5A-5B, 5C2-5F) for each flexure member 160. As shown in FIGS. 5A and 5C2, each first clamp 180a has first clamp attachment through openings 182, and each second clamp 180b has second clamp attachment through openings 184. As shown in FIG. 5C2, the first clamp attachment through openings 182 to clamp to the first flexure member 160a receive, or are configured to receive, the first clamp attachment elements 186 (see also FIG. 5B), such as in the form of bolts 186a, and the first clamp attachment through openings 182 to clamp to the second flexure member 160b receive, or are configured to receive, the first clamp attachment elements 187, such as in the form of bolts 187a. As further shown in FIG. 5C2, the second clamp attachment through openings 184 to clamp to the first flexure member 160a receive, or are configured to receive, the second clamp attachment elements 188 (see also FIG. 5B), such as in the form of bolts 188a, and the second clamp attachment through openings 184 to clamp to the second flexure member 160b receive, or are configured to receive, the second clamp attachment elements 189, such as in the form of bolts 189a.

As shown in FIG. 5C2, each of the clamps 180 has a first end 190a, a second end 190b, a body 192 formed between the first end 190a and the second end 190b, sides 194, an exterior side 196a, and an interior side 196b. The clamps 180 may be formed of a metal material or another suitably strong material. Each clamp 180 has a thickness 197 (see FIG. 10) measured horizontally across the side 194. Preferably, the thickness 197 (see FIG. 10) of each clamp is greater than the thickness 178 (see FIG. 10) of each flexure member 160. Further, each clamp 180 has a width 198 (see FIG. 10) measured from one side 194 to the opposite side 194. Preferably the width 198 (see FIG. 10) of each clamp is the same, or substantially the same as the width of each flexure member 160.

The robotic end effector assembly 70 (see FIGS. 5A-5F), such as in the form of flexure based robotic end effector assembly 70a (see FIGS. 5A-5F), further comprises an actuator 200 (see FIGS. 5A-5C1, 5D, 5F) coupled between the base plate 140 and the spindle support plate 120. The actuator 200 may comprise a linear actuator 200a (see FIG. 10) comprising one of, motor driven 200b (see FIG. 10), hydraulic driven 200c (see FIG. 10), piezoelectric driven 200d (see FIG. 10), solenoid driven 200e (see FIG. 10), pneumatically driven 200f (see FIG. 10), including air driven 200g (see FIG. 10), or another suitable type of driving mechanism. In one version, the actuator 200 (see FIG. 5C1) may comprise an air cylinder 202 (see FIG. 5C1).

The actuator 200 has a first end 204a (see FIG. 5C1), a second end 204b (see FIG. 5C2), an actuator tip 206 (see FIGS. 5A. 5C1, 5D), and an actuator body 208 (see FIGS. 5A. 5C1, 5D). The actuator 200 may be actuated or moved via an actuator power source 210 (see FIG. 10), comprising one of, an electric power source 210a (see FIG. 10), a hydraulic power source 210b (see FIG. 10), a pneumatic power source 210c (see FIG. 10), or another suitable actuator power source 210.

The robotic end effector assembly 70 (see FIGS. 5A-5F), such as in the form of flexure based robotic end effector assembly 70a (see FIGS. 5A-5F), further comprises actuator mounts 212 (see FIGS. 5A-5C1, 5D) to mount the actuator 200 between the base plate 140 and the spindle support plate 120. The actuator mounts 212 may comprise a first actuator mount 212a (see FIGS. 5A-5C1, 5D) and a second actuator mount 212b (see FIGS. 5A-5C1, 5D). As shown in FIGS. 5A and 5D, the first actuator mount 212a is coupled or attached to the base plate 140, and the second actuator mount 212b is coupled or attached to the spindle support plate 120. The actuator mounts 212 may be in the form of brackets 213 (see FIG. 5A) or another suitable mounting or attachment mechanism or device. The actuator 200, such as the linear actuator 200a, engages, or is configured to engage, the second actuator mount 212b attached to the spindle support plate 120, to displace the spindle support plate 120.

In one version, each of the actuator mounts 212 comprises a base attachment portion 214 (see FIGS. 5A, 5C1, 5D) with an attachment side 216 (see FIG. 5C1) and a central extending portion 221 (see FIGS. 5A, 5C1, 5D) extending from the base attachment portion 214. As shown in FIG. 5C1, the first actuator mount 212a has first actuator mount attachment through openings 218 that each receive, or are configured to receive, the attachment element 226 (see FIG. 5C2), such as bolt 226a (see FIG. 5C2), and the second actuator mount 212b has second actuator mount attachment through openings 220 that each receive, or are configured to receive, the attachment element 228, such as bolt 228a.

The first actuator mount 212a further includes a through opening 222 (see FIGS. 5A, 5C1, 5D) in the central extending portion 221 that receives, or is configured to receive, a portion of the actuator body 208 of the actuator 200, and the second actuator mount 212b further includes a through opening 224 (see FIGS. 5A, 5C1, 5D) in the central extending portion 221 that receives, or is configured to receive, the actuator tip 206 of the actuator 200.

In one version, as shown in FIGS. 5A-5C1, 5D, the robotic end effector assembly 70, such as in the form of flexure based robotic end effector assembly 70a, further comprises a stop assembly 230. The stop assembly 230 preferably comprises a stroke limit stop assembly 230a (see FIGS. 5A, 5C1). The stop assembly 230 comprises a stop element 232 (see FIGS. 5A-5C1, 5D), such as in the form of a bracket 232a (see FIGS. 5A, 5C1), attached or coupled to the base plate 140. As shown in FIG. 5C1, the stop element 232 comprises a first end 234a or bottom end, a second end 234b or top end, a first side 236a, and a second side 236b opposite the first side 236a. As further shown in FIG. 5C1, the stop element 232 comprises attachment through openings 238 formed through the first end 234a or bottom end, where each attachment through opening 238 receives, or is configured to receive, attachment elements 242 (see FIG. 5C2), such as in the form of bolts 242a. As further shown in FIG. 5C1, the stop element 232 preferably has a U-shaped interior 240.

The stop assembly 230 further comprises a stop element engagement portion 244 (see FIGS. 5A, 5C1, 5D), such as in the form of a bracket 244a (see FIGS. 5A, 5C1), attached or coupled to the spindle support plate 120. As shown in FIG. 5C1, the stop element engagement portion 244 comprises a first end 246a, a second end 246b, and a body 248 formed between the first end 246a and the second end 246b. The first end 246a fits, or is configured to fit, or floats, within the U-shaped interior 240 of the stop element 232, and between the first side 236a and the second side 236b of the stop element 232. When the actuator 200 engages the second actuator mount 212b upon actuation, the movement of the actuator 200 against the second actuator mount 212b displaces the spindle support plate 120 in a forward direction and then a back direction, and in turn, the stop element engagement portion 244, which is attached to the spindle support plate 120, moves in a forward direction and a back direction within the stop element 232 and is stopped by the first side 236a and the second side 236b of the stop element 232.

As shown in FIG. 5C1, the stop element engagement portion 244 further comprises attachment through openings 250 formed through the second end 246b. Each attachment through opening 250 receives, or is configured to receive, attachment elements 252 (see FIG. 5C2), such as in the form of bolts 245a. As further shown in FIG. 5C1, the stop element 232 preferably has a U-shaped interior 240.

The robotic end effector assembly 70 (see FIGS. 5A-5F), such as in the form of flexure based robotic end effector assembly 70a (see FIGS. 5A-5F), further comprises the robot adapter 74 coupled to the base plate 140 to form the base 72 (see FIG. 5A). As shown in FIG. 5A, the robot adapter 74 is coupled or attached to the robotic end effector attachment portion 68, both of which are part of the drilling system 60.

The robot adapter 74 comprises a first end 254a (see FIGS. 5C2, 5D), a second end 254b (see FIGS. 5C2, 5D, 5F), and a disk-shaped body 256 (see FIG. 5C2) formed therebetween. As shown in FIG. 5C2, the robot adapter 72 has a central through opening 258 and attachment through openings 260 that each receive, or are configured to receive, the attachment elements 264, such as bolts 264a, to connect the robot adapter 74 to the adapter attachment through openings 148 of the base plate 140. As further shown in FIG. 5C2, the robot adapter 74 may have additional openings 262.

Figure 6:
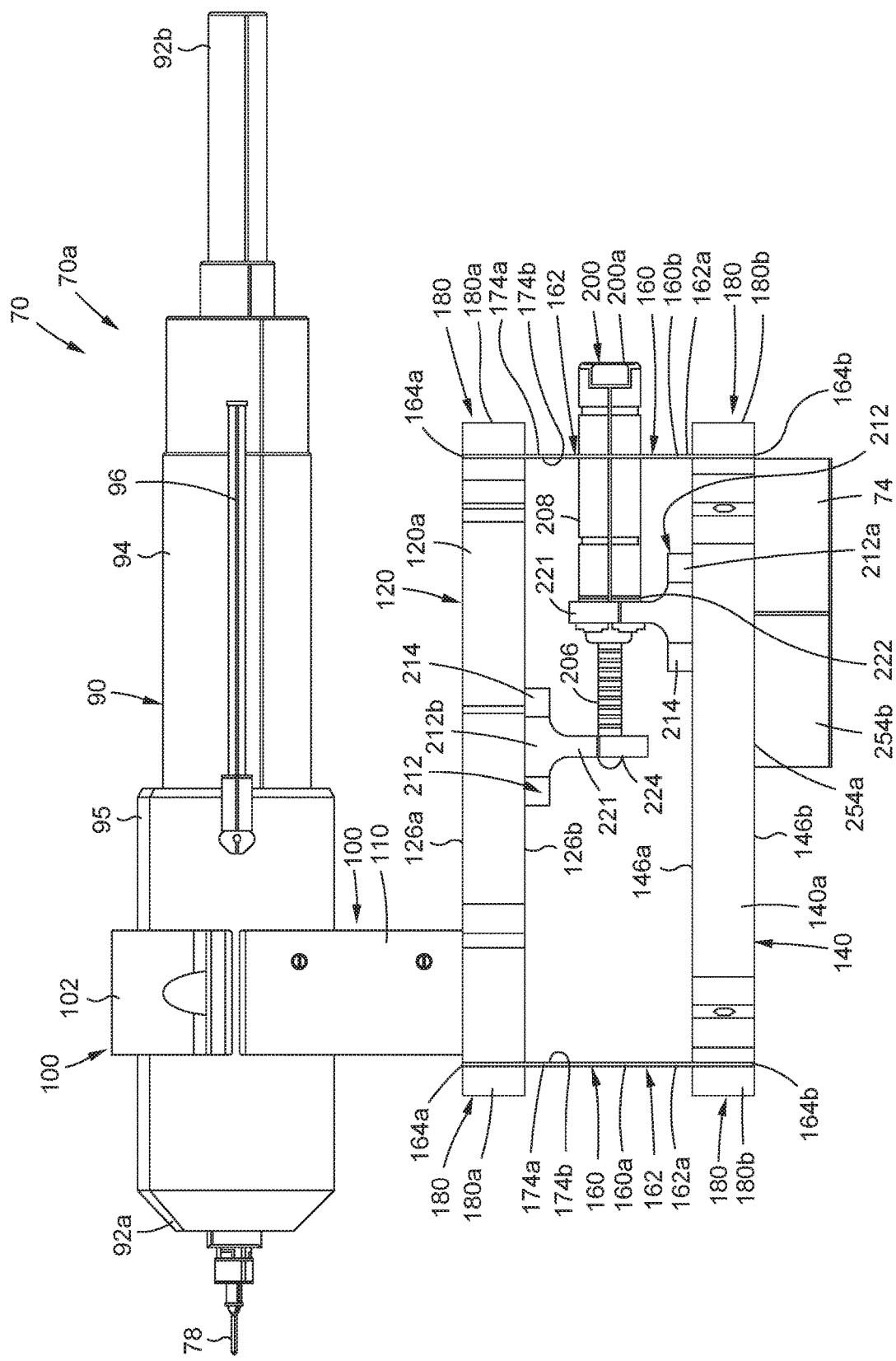
FIG. 6 is an illustration of a left side view of the robotic end effector assembly of FIG. 5D without a stop assembly.

Now referring to FIG. 6, FIG. 6 is an illustration of a left side view of the robotic end effector assembly 70, such as in the form of flexure based robotic end effector assembly 70a, of FIG. 5D, where the robotic end effector assembly 70 does not have a stop assembly 230, which is optional. As shown in FIG. 6, and as discussed above, the robotic end effector assembly 70 comprises the spindle 90 having the first end 92a, the second end 92b, the body 94 having the cylindrical configuration 95, the drill bit 78, and the side attachment element 96 attached or coupled to the spindle 90. As further shown in FIG. 6, the spindle 90 is clamped or held in place with the spindle clamp 100 comprising the first portion 102 and the second portion 110. The spindle clamp 100 (see FIG. 6) is attached to the spindle support plate 120, such as in the form of the upper motion stage plate 120a, having the first upper side 126a and the second lower side 126b.

As further shown in FIG. 6, the spindle support plate 120 is positioned substantially parallel with the base plate 140, such as in the form of the lower motion stage plate 140a, having the first upper side 146a and the second lower side 146b. The spindle support plate 120 is coupled to the base plate 140, via the two flexure members 160 (see FIG. 6), such as in the form of the first flexure member 160a (see FIG. 6) and the second flexure member 160b (see FIG. 6). The two flexure members 160 preferably comprise two flexure plates 162 (see FIG. 6), such as in the form of the first flexure plate 162a (see FIG. 6) and the second flexure plate 162b (see FIG. 6), and each flexure member 160 has the first end 164a (see FIG. 6) and the second end 164b (see FIG. 6), and the exterior side 174a (see FIG. 6) and the interior side 174b (see FIG. 6). As shown in FIG. 6, clamps 180, such as first clamp 180a and second clamp 180b, secure each of the two flexure members 160 in place against, or adjacent to, the opposite ends 122 (see FIG. 5A) of the first clamp 180a and against, or adjacent to, the opposite ends 142 (see FIG. 5A) of the second clamp 180b.

As further shown in FIG. 6, the actuator 200, such as a linear actuator 200a, is coupled between the base plate 140 and the spindle support plate 120. The actuator 200 has the actuator tip 206 coupled to the actuator body 208. Actuator mounts 212 (see FIG. 6), such as first actuator mount 212a (see FIG. 6) and second actuator mount 212b (see FIG. 6), are used to mount the actuator 200 between the base plate 140 and the spindle support plate 120. As shown in FIG. 6, the first actuator mount 212a is coupled or attached to the base plate 140, and the second actuator mount 212b is coupled or attached to the spindle support plate 120. Each actuator mount 212 comprises the base attachment portion 214 (see FIG. 6) and the central extending portion 221 (see FIG. 6) extending from the base attachment portion 214. The actuator 200 is inserted through the through opening 222 (see FIG. 6) of the first actuator mount 212a, and the actuator tip 206 of the actuator 200 engages with the through opening 224 (see FIG. 6) of the second actuator mount 212b. As further shown in FIG. 6, the robot adapter 74 having the first end 254a and the second end 254b is coupled or attached to the base plate 140 to form the base 72 (see FIG. 5A). The first end 254a of the robot adapter 74 is attached to a portion of the second lower side 146b of the base plate 140.

Figure 7A:
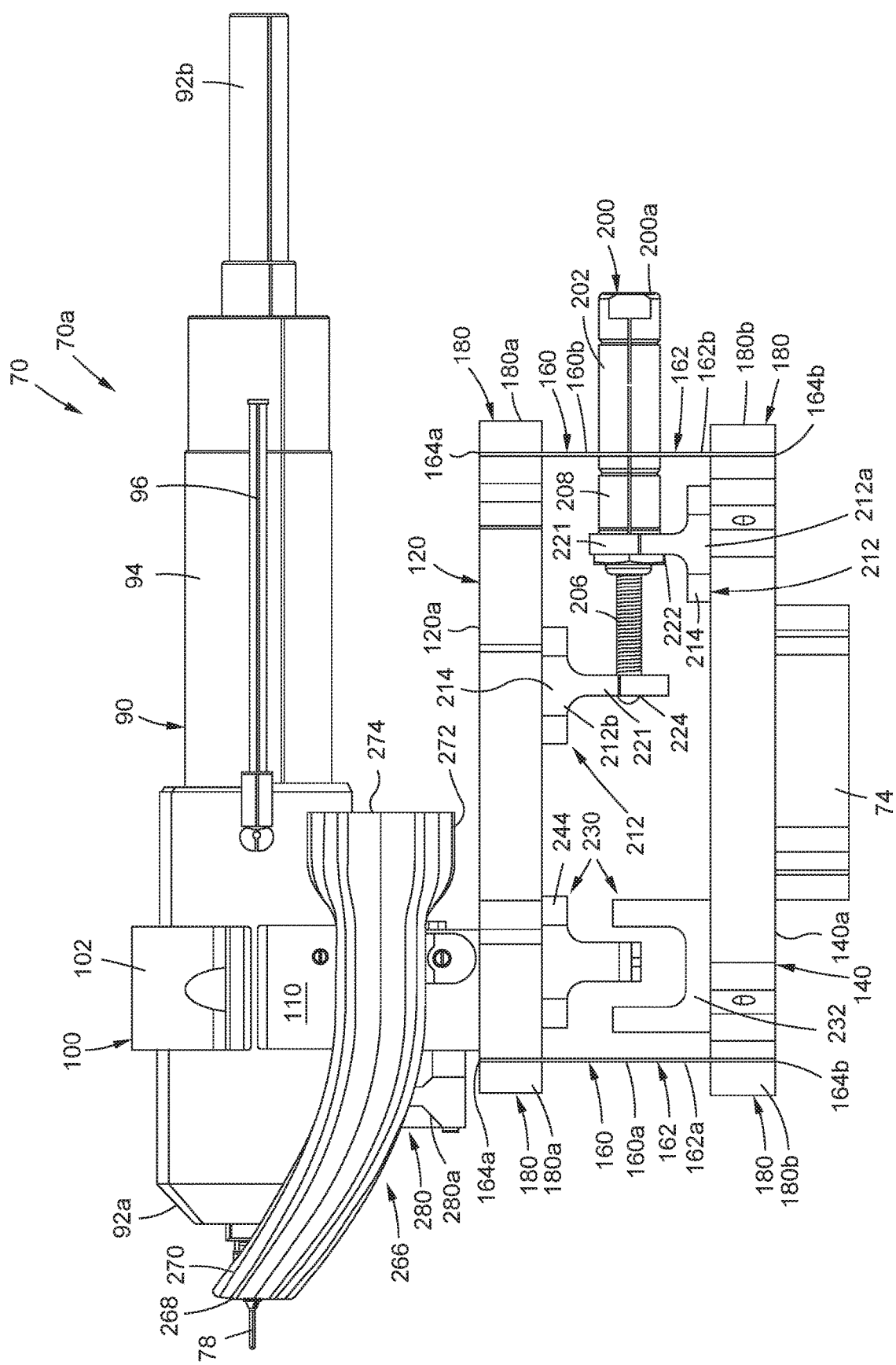
FIG. 7A is an illustration of a left side view of a version of a robotic end effector assembly of the disclosure having a vacuum attachment and a sensor.
Figure 7B:
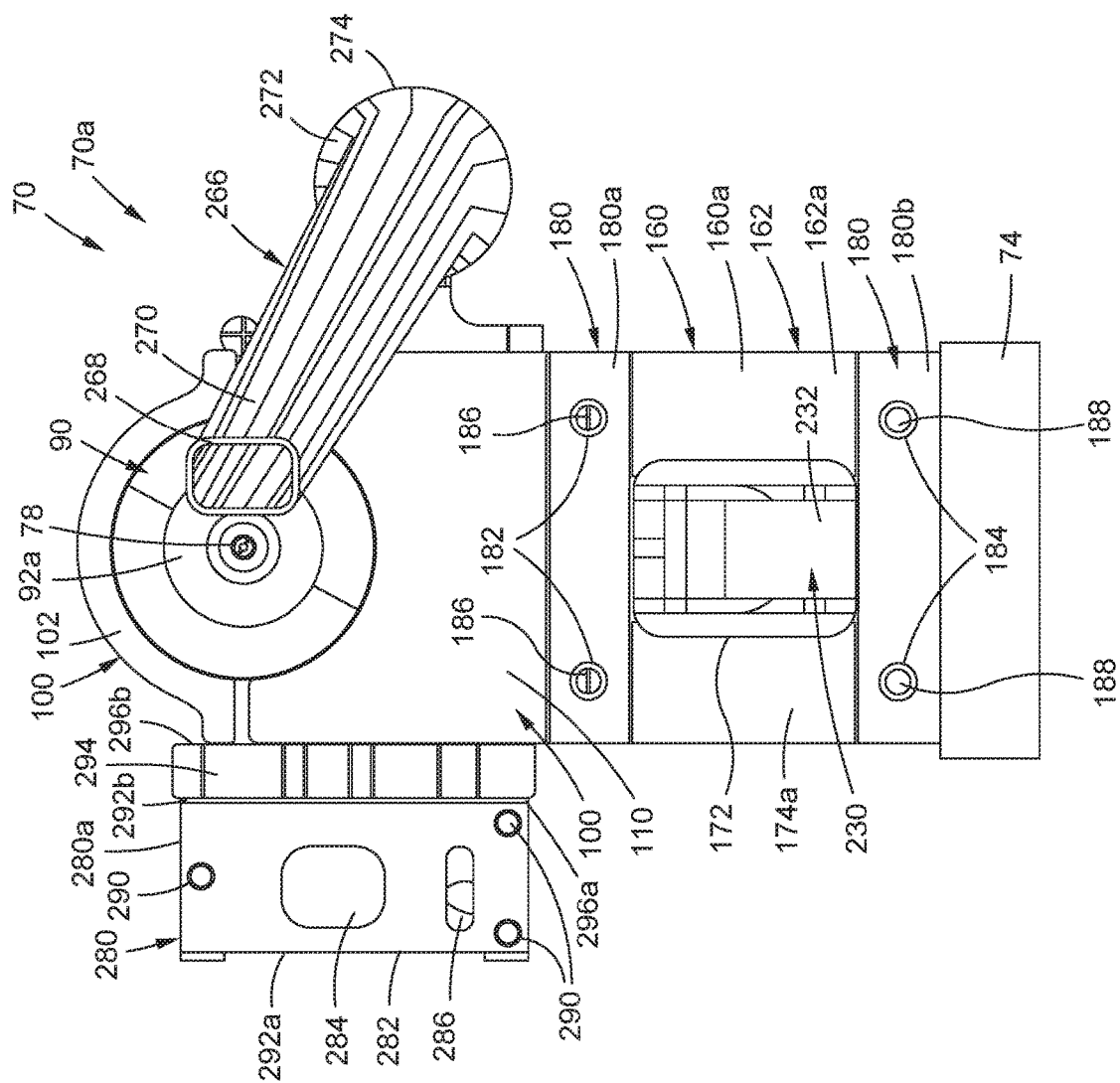
FIG. 7B is an illustration of a front view the robotic end effector assembly of FIG. 7A.

Now referring to FIGS. 7A-7B, FIG. 7A is an illustration of a left side view of a version of the robotic end effector assembly 70, such as in the form of flexure based robotic end effector assembly 70a, of FIG. 5D, of the disclosure having the optional features of a vacuum attachment 266, such as a dust collection device, and a sensor 280. FIG. 7B is an illustration of a front view the robotic end effector assembly 70, such as in the form of flexure based robotic end effector assembly 70a, of FIG. 7A.

As shown in FIGS. 7A-7B, the vacuum attachment 266 has a first end opening 268, a second end 272, and a body 270 formed between the first end opening 268 and the second end 272. As shown in FIGS. 7A-7B, the first end opening 268 is positioned near the drill bit 78 to collect dust or debris that may be produced from the drilling process. The second end 272 has a vacuum port 274 that connects, or is configured to connect to, a vacuum assembly 276 (see FIG. 10) that is powered with a vacuum power source 278 (see FIG. 10). The vacuum attachment 266 may be mounted to the side of the spindle clamp 100 (see FIGS. 7A-7B) or spindle mount, or may be mounted to another portion of the robotic end effector assembly 70.

As shown in FIGS. 7A-7B, the robotic end effector assembly 70 may further comprise the sensor 280, such as in the form of a laser distance sensor 280a, that faces and is positioned along the axis 80 (see FIGS. 4, 9) of the spindle 90, to measure a distance 288 (see FIG. 10) to the structure 30 (see FIGS. 4, 9), for example, the workpiece 32 (see FIGS. 4, 9) being drilled. As shown in FIG. 7B, in one version, the sensor 280 has a housing 282, a first window 284, or lens, through the housing 282, a second window 286, or lens, through the housing 282, attachments 290 connecting the front of the housing 282 to the back of the housing 282, a first side 292a, and a second side 292b. The sensor 280 may also be of another suitable shape or construction. As shown in FIG. 7B, the sensor 280 may include a sensor mount 294 having a first side 296a and a second side 296b. As further shown in FIG. 7B, the second side 292b of the housing 282 of the sensor 280 is attached or coupled to the first side 296a for the sensor mount 294. The sensor 280 and sensor mount 294, for example, at the second side 296b of the sensor mount 294, may be mounted or attached to the side of the spindle clamp 100 (see FIGS. 7A-7B) or spindle mount. Alternatively, the sensor 280 and sensor mount 294 may be mounted to another portion of the robotic end effector assembly 70. As shown in FIGS. 7A-7B, the sensor 280, including the sensor mount 294, and the vacuum attachment 266 are mounted on opposite sides of the spindle clamp 100 (see FIGS. 7A-7B) or spindle mount. However, in other versions, the sensor 280, including the sensor mount 294, and the vacuum attachment 266 may be mounted in other positions or arrangements to or on the robotic end effector assembly 70.

As shown in FIGS. 7A-7B, and as discussed above, the robotic end effector assembly 70 comprises the spindle 90 having the first end 92a, the second end 92b (see FIG. 7A), the body 94 (see FIG. 7A), the drill bit 78, and the side attachment element 96. FIGS. 7A-7B further show the spindle clamp 100 comprising the first portion 102 and the second portion 110. FIG. 7A shows the spindle clamp 100 attached to the spindle support plate 120, such as in the form of the upper motion stage plate 120a, which is positioned substantially parallel with the base plate 140, such as in the form of the lower motion stage plate 140a, and the spindle support plate 120 and the base plate 140 are coupled together via the two flexure members 160, such as in the form of the first flexure member 160a (see also FIG. 7B) and the second flexure member 160b.

The two flexure members 160 preferably comprise two flexure plates 162 (see FIGS. 7A-7B), such as in the form of the first flexure plate 162a (see FIGS. 7A-7B) and the second flexure plate 162b (see FIG. 7A), and each flexure member 160 has the first end 164a (see FIG. 7A) and the second end 164b (see FIG. 7A). FIG. 7B shows the central opening 172 and the exterior side 174a of the first flexure member 160a.

As shown in FIGS. 7A-7B, clamps 180, such as first clamp 180a and second clamp 180b, secure each of the two flexure members 160 in place against, or adjacent to, the opposite ends 122 (see FIG. 5A) of the first clamp 180a and against, or adjacent to, the opposite ends 142 (see FIG. 5A) of the second clamp 180b. FIG. 7B shows the first clamp attachment through openings 182 of the first clamp 180a attached to the flexure member 160 with first clamp attachment elements 186. FIG. 7B further shows the second clamp attachment through openings 184 of the second clamp 180b attached to the flexure member 160 with the second clamp attachment elements 188.

FIG. 7A shows the actuator 200, such as the linear actuator 200a, for example, an air cylinder 202, coupled between the base plate 140 and the spindle support plate 120. The actuator 200 has the actuator tip 206 coupled to the actuator body 208. Actuator mounts 212 (see FIG. 7A), such as the first actuator mount 212a (see FIG. 7A) and the second actuator mount 212b (see FIG. 7A), are used to mount the actuator 200 between the base plate 140 and the spindle support plate 120. FIG. 7A shows the base attachment portion 214 and the central extending portion 221 of each actuator mount 212. The actuator 200 is inserted through the through opening 222 (see FIG. 7A) of the first actuator mount 212a, and the actuator tip 206 of the actuator 200 engages with the through opening 224 (see FIG. 7A) of the second actuator mount 212b.

FIGS. 7A-7B further show the stop assembly 230, including the stop element 232 and the stop element engagement portion 244 (see FIG. 7A). As shown in FIG. 7A, the stop element 232 is coupled or attached to the base plate 140, and the stop element engagement portion 244 is attached to the spindle support plate 120. FIGS. 7A-7B further show the robot adapter 74 coupled or attached to the base plate 140.

Figure 8:
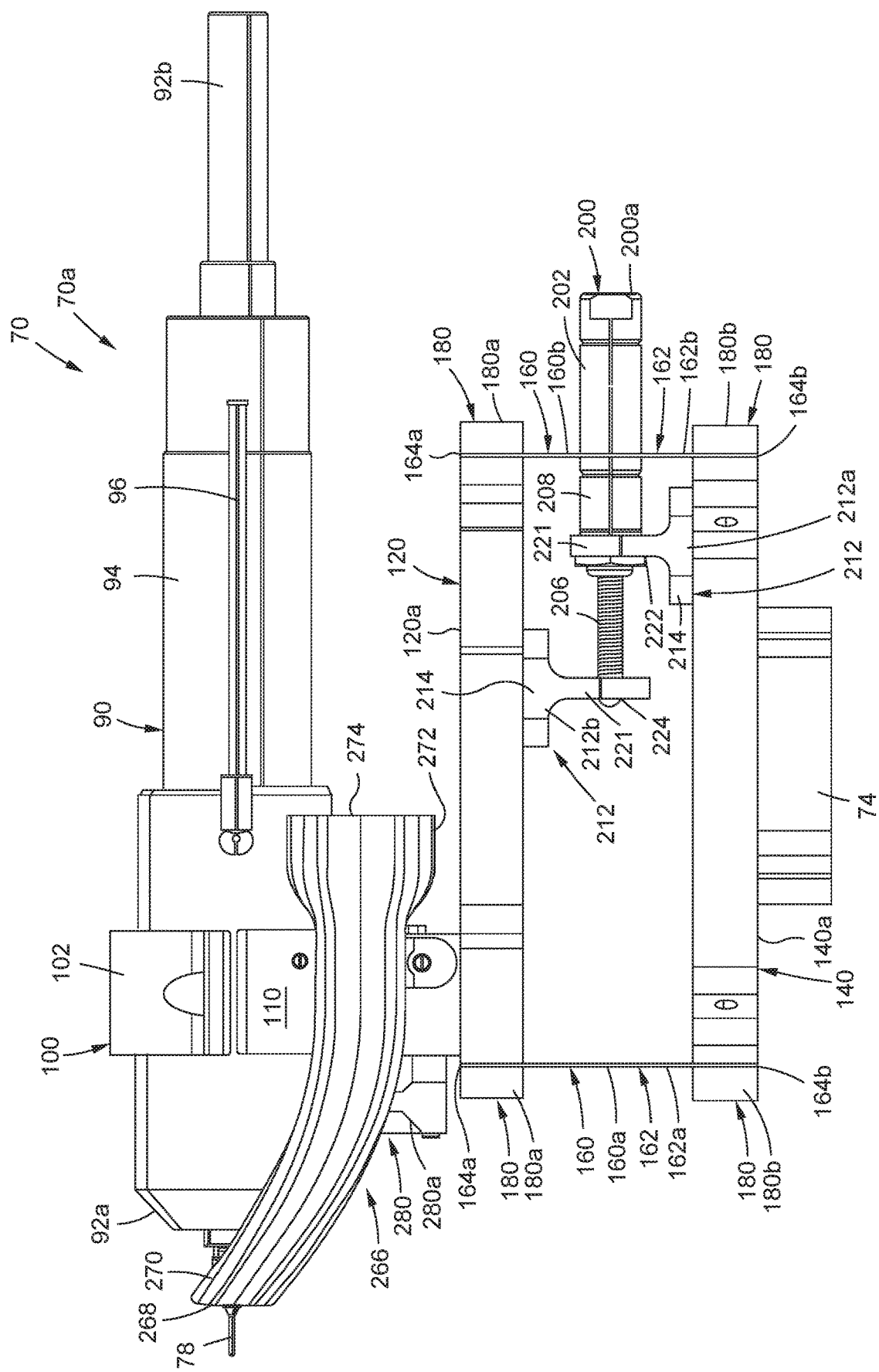
FIG. 8 is an illustration of a left side view of the robotic end effector assembly of FIG. 7A without a stop assembly.

Now referring to FIG. 8, FIG. 8 is an illustration of a left side view of the robotic end effector assembly, such as in the form of flexure based robotic end effector assembly 70a, of FIG. 7A, where the robotic end effector assembly 70 does not have the stop assembly 230, which may be optional. As shown in FIG. 8, and as discussed above with respect to FIG. 7A, the robotic end effector assembly 70 comprises the optional features of the vacuum attachment 266, such as a dust collection device, and the sensor 280. As further shown in FIG. 8, and as discussed in detail above with respect to FIG. 7A, the robotic end effector assembly 70 with the vacuum attachment 266, the sensor 280, and without the stop assembly 230, further comprises the spindle 90 with the drill bit 78, the spindle clamp 100, the spindle support plate 120, the base plate 140, the flexure members 160, the clamps 180, the actuator 200, the actuator mounts 212, and the robot adapter 74. The part details of these components are further discussed above with respect to FIG. 7A.

Figure 9:
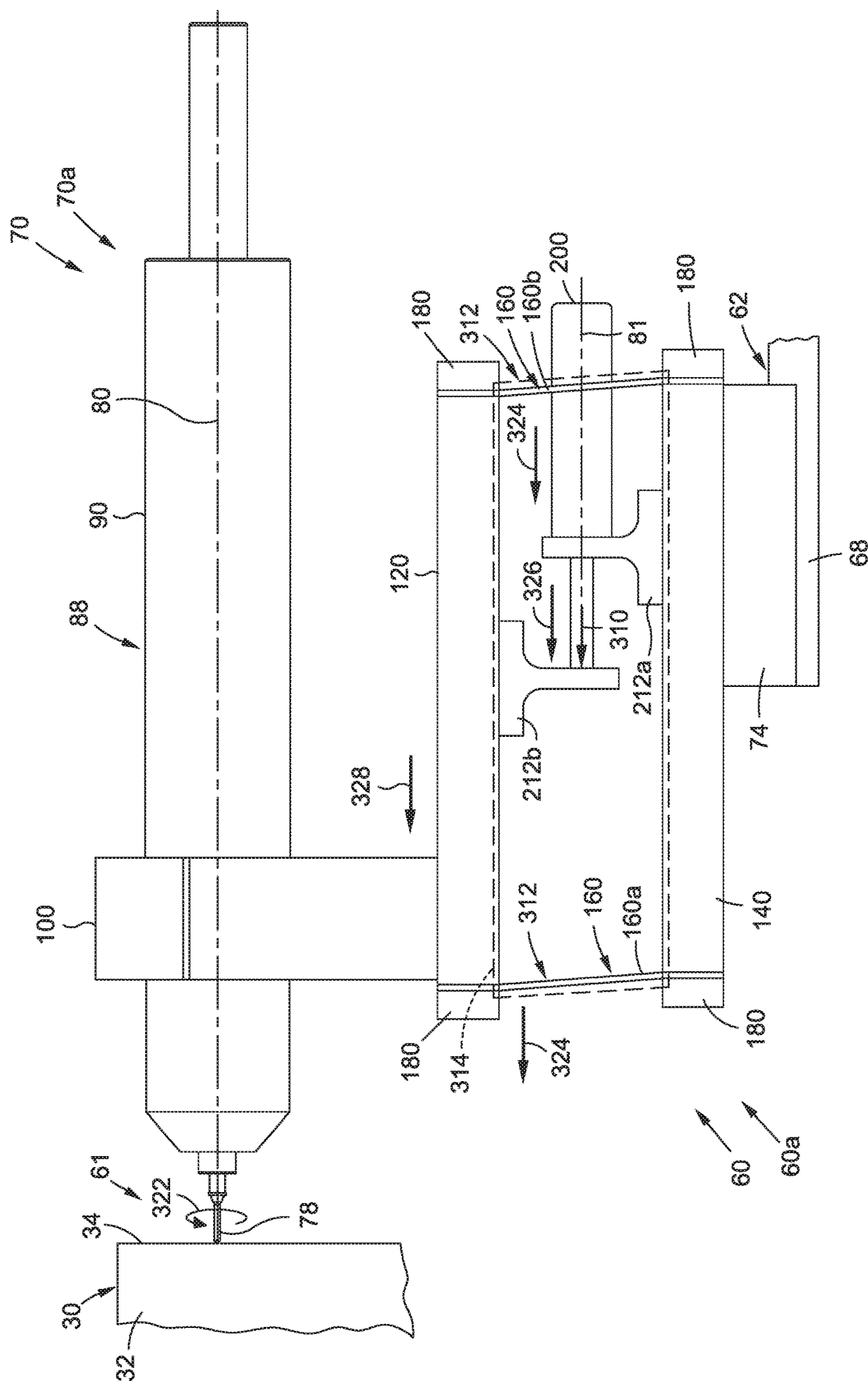
FIG. 9 is a schematic diagram showing a deflection of the flexure members in a robotic end effector assembly of a drilling system of the disclosure.

Now referring to FIG. 9, FIG. 9 is a schematic diagram showing a deflection 312 of the flexure members 160, such as the first flexure member 160a and the second flexure member 160b, in the robotic end effector assembly 70, such as the flexure based robotic end effector assembly 70a, of the drilling system 60, such as the robotic drilling system 60a, when the robotic end effector assembly 70 performs a drilling operation 61 on a structure 30, for example, a workpiece 32. FIG. 9 shows the tool 88, such as the spindle 90 having the axis 80, clamped in the spindle clamp 100, and the drill bit 78 in contact with the surface 34 of the structure 30 and rotating in a rotation direction 322 during the drilling operation 61.

FIG. 9 further shows the spindle support plate 120 coupled to the base plate 140, via the two flexure members 160, such as the first flexure member 160a and the second flexure member 160b, which are clamped or secured to the ends of the spindle support plate 120 and the base plate 140, via clamps 180. FIG. 9 further shows the actuator 200 having the axis 81, coupled to the first actuator mount 212a and engagedly coupled to the second actuator mount 212b. FIG. 9 further shows the robot adapter 74 coupled between the base plate 140 and the robotic end effector attachment portion 68, which is further coupled to the robot 62.

As shown in FIG. 9, when the actuator 200 is actuated in a forward direction 326, the actuator 200 engages or pushes against the second actuator mount 212b, which is attached to the spindle support plate 120, to displace the spindle support plate 120 forward in a forward direction 328, and to deflect or bend the flexure members 160 forward in a forward direction 324 with a force 310 (see FIG. 9). In addition, when the spindle 90 (see FIG. 9) contacts the surface 34 (see FIG. 9) of the structure 30 (see FIG. 9), such as the workpiece 32 (see FIG. 9), for the drilling operation 61 (see FIG. 9) and a drilling motion 298 (see FIG. 10), a force 310 (see FIG. 10) of the actuator 200 actuating between the spindle support plate 120 (see FIG. 9) and the base plate 140 (see FIG. 9) results in the deflection 312 (see FIG. 9) of the two flexure members 160 (see FIG. 9), and deflects the two flexure members 160, to form a parallelogram configuration 314 (see FIG. 9) by the two flexure members 160, while the rigid spindle support plate 120 and rigid base plate 140 do not deflect or bend. When the drilling operation 61 (see FIG. 9) is performed, the actuator 200 deflects the two flexure members 160 to press the drill bit 78 (see FIG. 9) against the surface 34 (see FIG. 9) of the structure 30 (see FIG. 9) and drill a perforation 82 (see FIG. 4) or a hole 83 (see FIG. 10) or a slot 85 (see FIG. 10). The two flexure members 160 allow a linear motion 318 (see FIG. 10) along the axis 80 (see FIG. 9) of the spindle 90, to inhibit an off-axis drilling motion 300 (see FIG. 10), such as an off-axis spindle drilling motion 300a (see FIG. 10), as the spindle support plate 120 is displaced. In addition, the actuator 200 (see FIG. 9) may have a limited stroke 304 (see FIG. 10) configured to limit a distance 306 (see FIG. 10) that the spindle support plate 120 (see FIG. 9) is displaced by the actuator 200. As the two flexure members 160 in the parallelogram configuration 314 (see FIG. 9) move or deflect, the spindle 90 may be slightly or minimally displaced, but the two flexure members 160 in the parallelogram configuration 314 (see FIG. 9) maintain the alignment 316 (see FIG. 10) of the spindle 90 normal relative to the surface 34 (see FIG. 9) of the structure 30 (see FIG. 9), such as the workpiece 32 (see FIG. 9).

Optionally, the robotic end effector assembly 70 may comprise the stop assembly 230 (see FIG. 5A) comprising the stop element 232 (see FIG. 5A) attached to the base plate 140 and the stop element engagement portion 244 (see FIG. 5A) attached to the spindle support plate 120, where the stop element engagement portion 244 engages, or is configured to engage, the stop element 232, to limit the distance 306 (see FIG. 10) that the spindle support plate 120 is displaced by the actuator 200.

Figure 10:
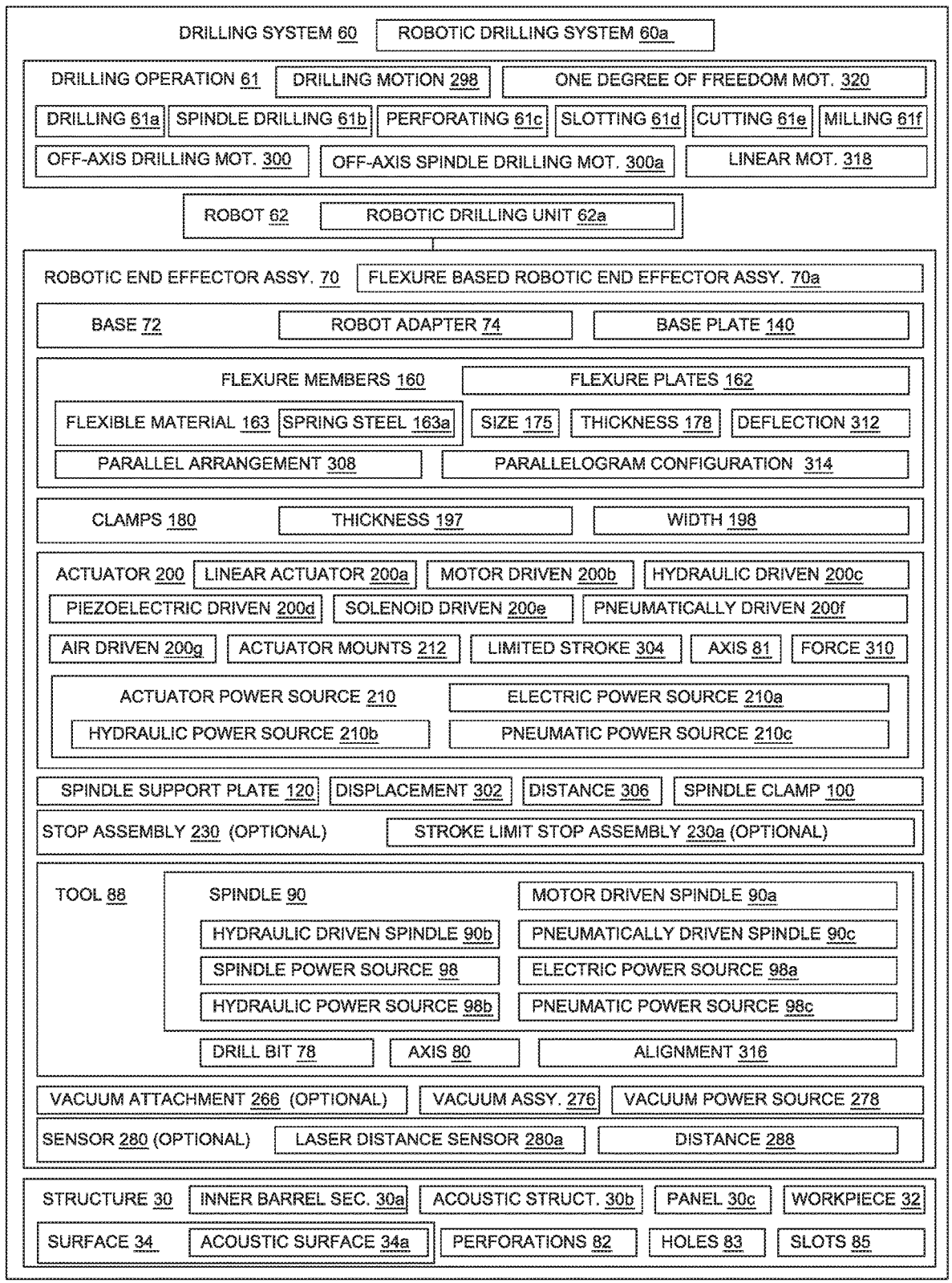
FIG. 10 is an illustration of a functional block diagram of a version of a drilling system with a robotic end effector assembly of the disclosure.

Now referring to FIG. 10, FIG. 10 is an illustration of a functional block diagram of a version of the drilling system 60, such as the robotic drilling system 60a, comprising the robotic end effector assembly 70, such as the flexure based robotic end effector assembly 70a, of the disclosure.

As shown in FIG. 10, the drilling system 60 comprises a robot 62, such as in the form of a robotic drilling unit 62a, or another suitable type of robot 62 that can perform a drilling operation 61, including a drilling motion 298. The robot 62, such as the robotic drilling unit 62a, preferably has a robotic end effector attachment portion 68 (see FIG. 4) and other robotic components discussed above with respect to FIG. 4. As shown in FIG. 10, the drilling operation 61 that may be performed using the robotic end effector assembly 70 of the drilling system 60 may comprise one of, drilling 61a, including spindle drilling 61b, perforating 61c, slotting 61d, cutting 61e, milling 61f, or another suitable drilling operation 61. The robotic end effector assembly 70 of the drilling system 60 is particularly suited for drilling operations 61 to acoustically treat surfaces or rapidly perforate a sheet of material.

As further shown in FIG. 10, the drilling system 60 comprises the robotic end effector assembly 70, such as the flexure based robotic end effector assembly 70a, attached to the robot 62. The structural design of the robotic end effector assembly 70 allows for a one degree of freedom motion 320 (see FIG. 10) along the axis 80 (see FIG. 10) of the spindle 90 (see FIG. 10).

The robotic end effector assembly 70 (see FIG. 10) of the drilling system 60 comprises the base 72 (see FIG. 10) attached to the robotic end effector attachment portion 68 (see FIG. 4). As shown in FIG. 10, the base 72 comprises the robot adapter 74 coupled to the base plate 140. The robotic end effector assembly 70 (see FIG. 10) of the drilling system 60 further comprises the spindle support plate 120 (see FIG. 10), which is positioned substantially parallel with and coupled to the base plate 140, via two flexure members 160 (see FIG. 10), such as in the form of flexure plates 162 (see FIG. 10).

Each of the flexure members 160 are comprised of a flexible material 163 (see FIG. 10), such as spring steel 163a (see FIG. 10), or another suitable flexible material 163, and the flexure members 160 are resilient. The two flexure members 160, such as in the form of flexure plates 162, are each preferably of a size 175 (see FIG. 10) that is equal or the same. Each flexure member 160 has a thickness 178 (see FIG. 10) that is preferably equal or the same. The two flexure members 160 allow a linear motion 318 (see FIG. 10) along the axis 80 (see FIG. 10) of the spindle 90, maintain an alignment 316 of the spindle 90 along the axis 80 of the spindle 90, allow the spindle support plate 120 to be displaced or moved, and inhibit an off-axis drilling motion 300 (see FIG. 10), such as an off-axis spindle drilling motion 300a (see FIG. 10), as the spindle support plate 120 is displaced. The two flexure members 160, such as the flexure plates 162, are positioned in a parallel arrangement 308 (see FIG. 10) between the spindle support plate 120 and the base plate 140, and a force 310 (see FIG. 10) of the actuator 200 (see FIG. 10), such as the linear actuator 200a (see FIG. 10), actuating between the spindle support plate 120 (see FIG. 10) and the base plate 140 (see FIG. 10) results in a deflection 312 (see FIG. 10) of the two flexure members 160, such as the flexure plates 162, to form a parallelogram configuration 314 (see FIG. 10) by the two flexure members 160, such as the flexure plates 162.

As further shown in FIG. 10, the robotic end effector assembly 70 of the drilling system 60 comprises clamps 180 configured to secure the two flexure members 160 in place against or adjacent to the ends of the spindle support plate 120 and the base plate 140. The two flexure members 160 (see FIG. 10) are preferably positioned in a parallel arrangement 308 (see FIG. 10) and secured between the spindle support plate 120 and the base plate 140 with the clamps 180. Each clamp 180 has a thickness 197 (see FIG. 10) and a width 198 (see FIG. 10), where the thickness 197 of the clamp 180 is preferably greater than the thickness 178 of each flexure member 160, and where the width 198 of each clamp 180 is the same, or substantially the same as the width of each flexure member 160.

As further shown in FIG. 10, the robotic end effector assembly 70 of the drilling system 60 comprises the actuator 200 coupled between the base plate 140 and the spindle support plate 120. As shown in FIG. 10, the actuator 200 may comprise a linear actuator 200a comprising one of, motor driven 200b, hydraulic driven 200c, piezoelectric driven 200d, solenoid driven 200e, pneumatically driven 200f, including air driven 200g, or another suitable type of driving mechanism. As shown in FIG. 10, the actuator 200 may be actuated or moved via an actuator power source 210, comprising one of, an electric power source 210a, a hydraulic power source 210b, a pneumatic power source 210c, or another suitable actuator power source 210.

The robotic end effector assembly 70 (see FIG. 10) further comprises actuator mounts 212 (see FIG. 10) to mount the actuator 200 between the base plate 140 and the spindle support plate 120. The actuator mounts 212 (see FIG. 10) may be in the form of brackets 213 (see FIG. 5A) or another suitable mounting or attachment mechanism or device. The actuator 200 (see FIG. 10) may have a limited stroke 304 (see FIG. 10) configured to limit a distance 306 (see FIG. 10) that the spindle support plate 120 (see FIG. 10) is displaced by the actuator 200, such as the linear actuator 200a.

As further shown in FIG. 10, the robotic end effector assembly 70 of the drilling system 60 comprises a tool 88, such as a spindle 90, disposed on or coupled to the spindle support plate 120, via the spindle clamp 100, which is attached to the spindle support plate 120. As shown in FIG. 10, the spindle 90 has a drill bit 78 and an axis 80, such as a central longitudinal axis, and may comprise one of, a motor driven spindle 90a, a hydraulic driven spindle 90b, a pneumatically driven spindle 90c, or another suitable type of spindle 90. As further shown in FIG. 10, the spindle 90 may be powered with a spindle power source 98 comprising an electric power source 98a, a hydraulic power source 98b, a pneumatic power source 98c, or another suitable spindle power source 98.

As further shown in FIG. 10, the robotic end effector assembly 70 of the drilling system 60 may further optionally comprise a stop assembly 230, such as in the form of a stroke limit stop assembly 230a. The stop assembly 230 may comprise the stop element 232 (see FIG. 5A) attached to the base plate 140 and the stop element engagement portion 244 (see FIG. 5A) attached to the spindle support plate 120. The stop element engagement portion 244 is configured to engage the stop element 232, to limit the distance 306 (see FIG. 10) of a displacement 302 (see FIG. 10) of the spindle support plate 120 that is displaced by the actuator 200.

As further shown in FIG. 10, the robotic end effector assembly 70 of the drilling system 60 may optionally include a vacuum attachment 266 that couples, or is configured to be coupled to, a vacuum assembly 276 that is powered with a vacuum power source 278. As further shown in FIG. 10, the robotic end effector assembly 70 may optionally include a sensor 280, such as in the form of a laser distance sensor 280a, that measures, or is configured to measure, a distance 288 to the structure 30 that is to be drilled or undergo the drilling operation 61.

As further shown in FIG. 10, the drilling system 60 comprises a structure 30, that may comprise an inner barrel section 30a of a nacelle 22 (see FIG. 1) of a gas turbine engine 20a (see FIG. 1) of an aircraft 10a (see FIG. 1), another type of acoustic structure 30b, a panel 30c, a workpiece 32, or another suitable structure 30 that may undergo a drilling operation 61, or material removal operation, to create or form perforations 82, holes 83, slots 85, or other types of openings through a structure 30. The robotic end effector assembly 70 may be particularly applicable to structures 30 that may be hollow or may have a thin wall or thickness. As further shown in FIG. 10, the structure 30 comprises a surface 34 to be drilled by the robotic end effector assembly 70. The surface 34 may comprise an acoustic surface 34a (see FIG. 10), or another suitable surface. The structure 30 (see FIG. 10), for example, the workpiece 32 (see FIG. 10), is preferably positioned opposite the spindle 90 of the robotic end effector assembly 70, and in particular, opposite and adjacent to the drill bit 78 of the spindle 90, during the drilling operation 61.

Figure 11:
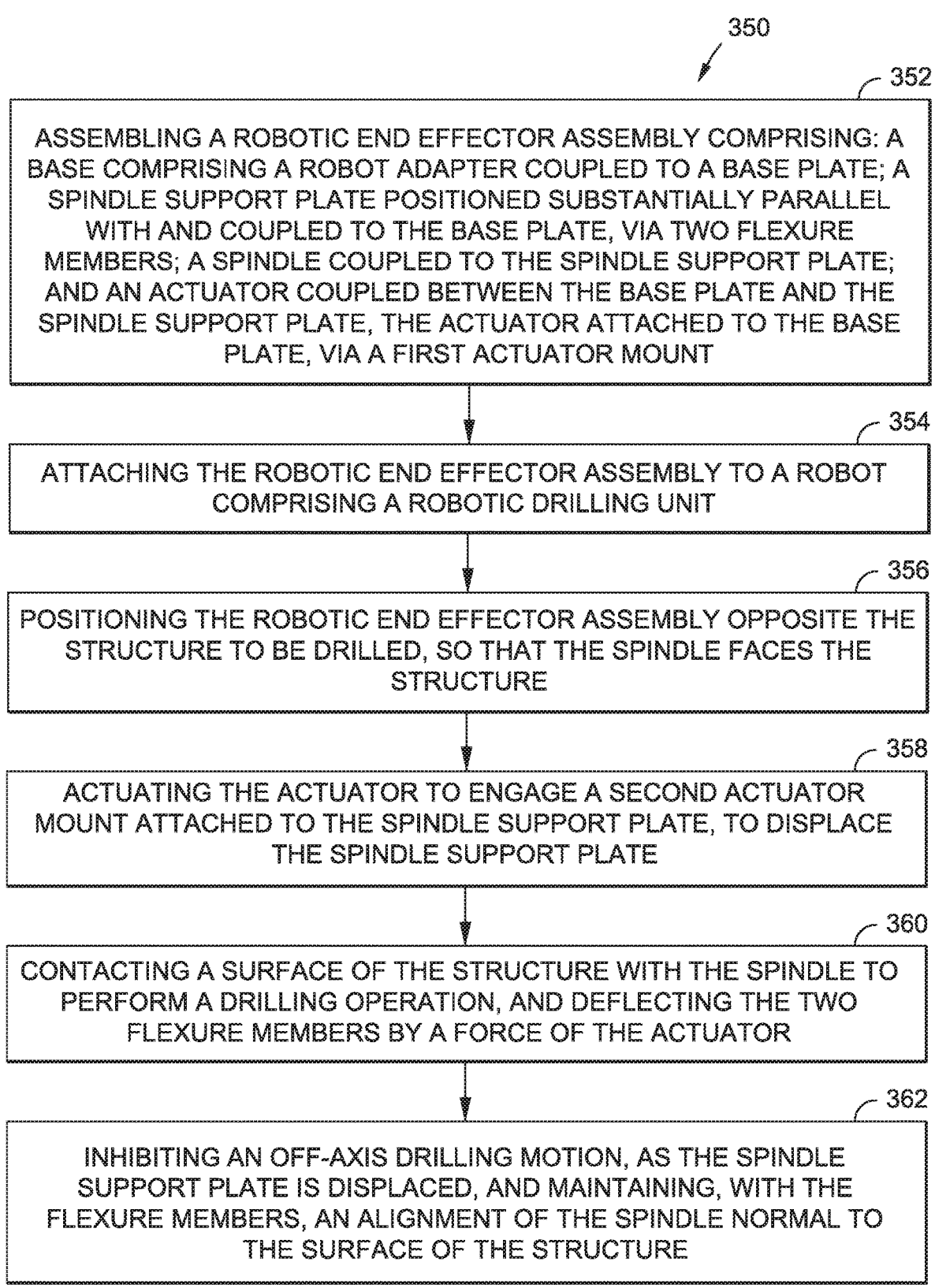
FIG. 11 is an illustration of a flow diagram showing a version of a method of the disclosure.

Now referring to FIG. 11, in another version there is provided a method 350 of using a robotic end effector assembly 70 (see FIGS. 4-9), such as a flexure based robotic end effector assembly 70a (see FIGS. 5A-9), to perform a drilling operation 61 (see FIGS. 4, 9, 10) on a structure 30 (see FIGS. 4, 9). FIG. 11 is an illustration of a flow diagram showing a version of the method 350 (see FIG. 11) of the disclosure.

As shown in FIG. 11, the method 350 comprises step 352 of assembling a robotic end effector assembly 70 (see FIGS. 4-9). As discussed in detail above, the robotic end effector assembly 70 (see FIG. 5A) comprises the base 72 (see FIG. 5A) comprising the robot adapter 74 (see FIG. 5A) coupled to a base plate 140 (see FIG. 5A). The robotic end effector assembly 70 further comprises the spindle support plate 120 (see FIG. 5A) positioned substantially parallel with and coupled to the base plate 140, via two flexure members 160 (see FIG. 5A), including the first flexure member 160a (see FIG. 5A) and the second flexure member 160b (see FIG. 5A). The flexure members 160 may comprise two flexure plates 162 (see FIG. 5A), such as the first flexure plate 162a (see FIG. 5A) and the second flexure plate 162b (see FIG. 5A), and each of the flexure members 160 are clamped to the ends of the spindle support plate 120 and the base plate 140 with clamps 180 (see FIG. 5A), such as first clamp 180a (see FIG. 5A) and second clamp 180b (see FIG. 5A). The robotic end effector assembly 70 further comprises the spindle 90 (see FIG. 5A) coupled to the spindle support plate 120 (see FIG. 5A), via the spindle clamp 100 (see FIG. 5A) attached to the spindle support plate 120. The robotic end effector assembly 70 further comprises the actuator 200 (see FIG. 5A) coupled between the base plate 140 and the spindle support plate 120. The actuator 200 is attached to the base plate 140, via the actuator mount 212 (see FIG. 5A), such as the first actuator mount 212a (see FIG. 5A). The actuator 200 is attached to the spindle support plate 120, via the actuator mount 212, such as the second actuator mount 212b (see FIG. 5A).

The step 352 (see FIG. 11) of assembling the robotic end effector assembly 70 may further comprise assembling 352 the robotic end effector assembly 70 with the actuator 200 comprising a linear actuator 200a (see FIG. 5A), and the actuator 200 having a limited stroke 304 (see FIG. 10) configured to limit a distance 306 (see FIG. 10) that the spindle support plate 120 is displaced by the actuator 200.

The step 352 (see FIG. 11) of assembling the robotic end effector assembly 70 may further comprise assembling 352 the robotic end effector assembly 70 comprising a stop assembly 230 (see FIG. 5A) comprising a stop element 232 (see FIG. 5A) attached to the base plate 140 and a stop element engagement portion 244 (see FIG. 5A) attached to the spindle support plate 120. The stop element engagement portion 244 is configured to engage the stop element 232, to limit the distance 306 (see FIG. 10) that the spindle support plate 120 is displaced by the actuator 200.

As shown in FIG. 11, the method 350 further comprises step 354 (see FIG. 11) of attaching the robotic end effector assembly 70 to a robot 62 (see FIGS. 4, 9) comprising a robotic drilling unit 62a (see FIG. 4).

As shown in FIG. 11, the method 350 further comprises step 356 (see FIG. 11) of positioning the robotic end effector assembly 70 (see FIG. 4) opposite the structure 30 (see FIG. 4) to be drilled, so that the spindle 90 (see FIG. 4) faces the structure 30, and in particular, so that the first end 92a of the spindle 90 with the drill bit 78 attached face the surface 34 (see FIG. 9) of the structure 30 (see FIG. 9), such as the workpiece 32 (see FIG. 9).

As shown in FIG. 11, the method 350 further comprises step 358 of actuating the actuator 200 with an actuating mechanism and an actuator power source 210 (see FIG. 10) forward in a forward direction 326 (see FIG. 9) to engage the second actuator mount 212b (see FIG. 5A) attached to the spindle support plate 120, to displace or move the spindle support plate 120, preferably in a forward direction 328 (see FIG. 9), and to deflect or bend the flexure members 160 forward in a forward direction 324 (see FIG. 9).

As shown in FIG. 11, the method 350 further comprises step 360 of contacting the surface 34 (see FIGS. 4, 9) of the structure 30 (see FIGS. 4, 9) with the spindle 90 (see FIGS. 4, 9) to perform the drilling operation 61 (see FIG. 4), and deflecting the two flexure members 160 by a force 310 (see FIG. 10) of the actuator 200 (see FIG. 9) actuating between the spindle support plate 120 (see FIG. 9) and the base plate 140 (see FIG. 9). This results in the deflection 312 (see FIG. 9) of the two flexure members 160 (see FIG. 9) and forming of a parallelogram configuration 314 (see FIG. 9), or substantially parallelogram configuration, by the two flexure members 160, while the rigid spindle support plate 120 and the rigid base plate 140 do not deflect or bend.

The step 360 (see FIG. 11) of contacting the surface 34 (see FIG. 4) of the structure 30 (see FIG. 4) with the spindle 90 (see FIG. 4) to perform the drilling operation 61 (see FIG. 4) further comprises contacting 360 the surface 34 comprising an acoustic surface 34a (see FIG. 4) to perform the drilling operation 61 comprising one of, drilling 61a (see FIG. 10), spindle drilling 61b (see FIG. 10), perforating 61c (see FIG. 10), slotting 61d (see FIG. 10), cutting 61e (see FIG. 10), milling 61f (see FIG. 10), or another suitable drilling operation 61.

As shown in FIG. 11, the method 350 further comprises step 362 of inhibiting an off-axis drilling motion 300 (see FIG. 10), such as an off-axis spindle drilling motion 300a (see FIG. 10), as the spindle support plate 120 is displaced, and maintaining, with the flexure members 160, an alignment 316 (see FIG. 10) of the spindle 90 (see FIG. 4) normal to the surface 34 (see FIGS. 4, 9) of the structure 30 (see FIG. 4, 9). The two flexure members 160 allow the linear motion 318 (see FIG. 10) along the axis 80 (see FIG. 9) of the spindle 90, to inhibit the off-axis drilling motion 300 (see FIG. 10), such as the off-axis spindle drilling motion 300a (see FIG. 10), as the spindle support plate 120 is displaced in the forward direction 328 (see FIG. 9).

Figure 12:
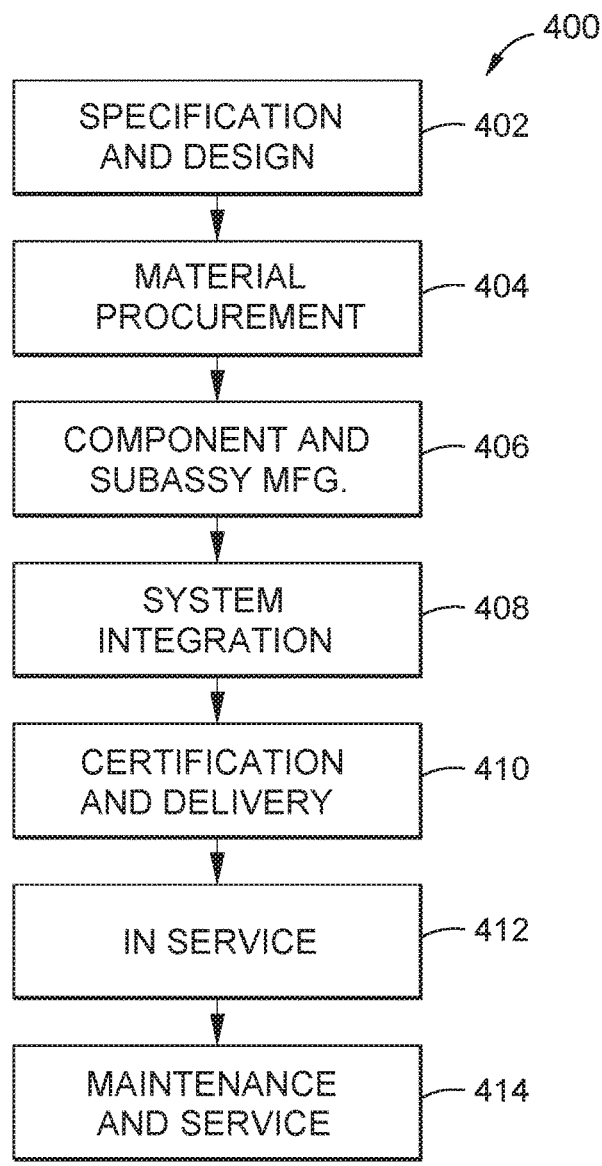
FIG. 12 is an illustration of a flow diagram of an aircraft manufacturing and service method.
Figure 13:
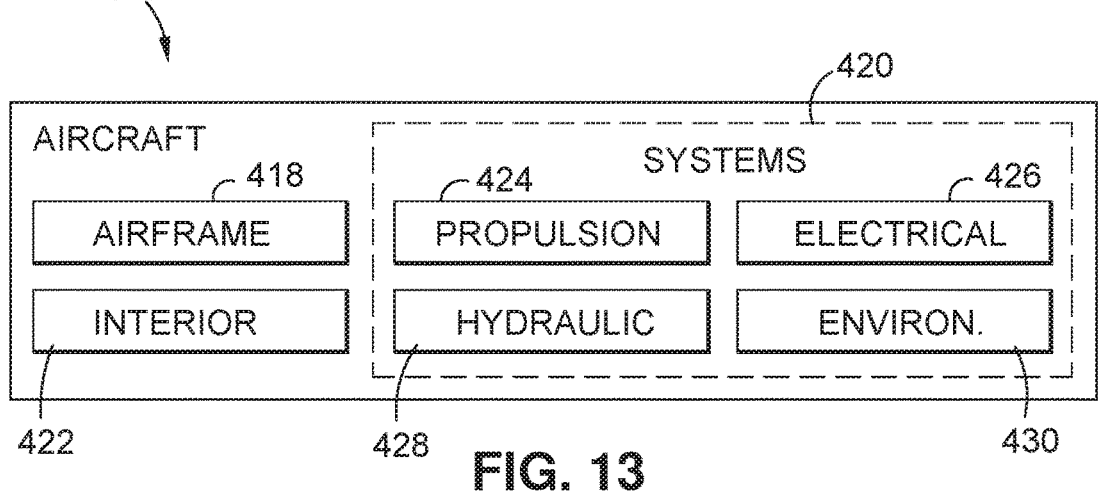
FIG. 13 is an illustration of a block diagram of an aircraft.

FIG. 12 is an illustration of a flow diagram of an aircraft manufacturing and service method 400. FIG. 13 is an illustration of a block diagram of an aircraft 416. Referring to FIGS. 12 and 13, embodiments of the disclosure may be described in the context of the aircraft manufacturing and service method 400 as shown in FIG. 12, and the aircraft 416 as shown in FIG. 13.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 12, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed embodiments of the robotic end effector assembly 70 (see FIGS. 4-9), the drilling system 60 (see FIGS. 4, 9, 10), and the method 350 (see FIG. 11) provide for a flexure based robotic end effector assembly 70a (see FIGS. 5A-10) designed to allow short motion along an axis 80 (see FIG. 4) of the spindle 90 (see FIG. 4) to produce a drilling motion 298 (see FIG. 10) that is straight or linear for a drilling operation 61 (see FIG. 10), such as drilling perforations 82 (see FIG. 10), holes 83 (see FIG. 10), and slots 85 (see FIG. 10), in a structure 30 (see FIG. 10), such as an acoustic structure 30b (see FIG. 10). The structural design of the robotic end effector assembly 70 (see FIGS. 5A-10) allows for a one degree of freedom motion 320 (see FIG. 10) along the axis 80 (see FIG. 10) of the spindle 90 (see FIG. 10) while retaining rigidity in other planes. In particular, the two flexure members 160 (see FIGS. 5A, 9, 10) of the flexure based robotic end effector assembly 70a (see FIGS. 5A-10) allow a linear motion 318 (see FIG. 10) along the axis 80 (see FIGS. 9, 10) of the spindle 90 (see FIGS. 9, 10), to inhibit an off-axis drilling motion 300 (see FIG. 10), such as an off-axis spindle drilling motion 300a (see FIG. 10), as the spindle support plate 120 (see FIGS. 9, 10) is displaced. The two flexure members 160 also maintain an alignment 316 (see FIG. 10) of the spindle 90 along the axis 80 of the spindle 90, as the spindle support plate 120 is displaced. The two flexure members 160 (see FIGS. 5A, 9, 10) are flexible and resilient and deform under load along the axis 80 of the spindle 90. The two flexure members 160 may bend or deflect significantly, while the spindle support plate 120 (see FIGS. 5A-10) and the base plate 140 (see FIGS. 5A-10) remain rigid. The two flexure members 160 may deflect or bend to form a parallelogram configuration 314 (see FIGS. 9, 10). The robotic end effector assembly 70 (see FIGS. 4-9) solves the problem of spindle movement and off-axis drilling with the spindle support plate 120 (see FIG. 5A) coupled to the base plate 140 (see FIG. 5A), via the two flexure members 160 (see FIG. 5A) that maintain the spindle 90 (see FIG. 5A) parallel and aligned.

In addition, disclosed versions of robotic end effector assembly 70 (see FIGS. 4-9), the drilling system 60 (see FIGS. 4, 9, 10), and the method 350 (see FIG. 11) significantly minimize or eliminate the occurrence of spindle 90 (see FIGS. 4-10) movement and deviations on entry into and exit out of drilled perforations 82, holes 83, and slots 85, as there is no axis reversal. Such minimization or elimination of spindle movement and drilling deviations lead to improved quality of the drilled perforations 82, holes 83, and slots 85. Improvement in hole quality may result in decreased time and resources spent by quality control in determining how close to engineering limits or tolerances the holes are. Improvement in slot quality may allow increased percent-open-area (POA) of the inner wall (e.g., the total area of the perforations as a percentage of the surface area of the inner wall which is a characteristic of acoustic structures for measuring their overall effectiveness in absorbing or attenuating noise) slotting by stress due to lower stress concentrations opening up the window on possible acoustic treatments.

Further, disclosed versions of the robotic end effector assembly 70 (see FIGS. 4-9), the drilling system 60 (see FIGS. 4, 9, 10), and the method 350 (see FIG. 11) provide do not require the use of sliding parts or linear rails, and thus, no unwanted debris due to friction of sliding parts is produced, and increased weight and increased wear to the system are avoided.

Many modifications and other versions or embodiments of the disclosure will come to mind to one skilled in the art to which this disclosure pertains having the benefit of the teachings presented in the foregoing descriptions and the associated drawings. The versions or embodiments described herein are meant to be illustrative and are not intended to be limiting or exhaustive. Although specific terms are employed herein, they are used in a generic and descriptive sense only and not for purposes of limitation.

What is claimed is:

1. A robotic end effector assembly comprising:
a base configured to be connected to a robot, the base comprising a robot adapter coupled to a base plate;
a spindle support plate positioned substantially parallel with and coupled to the base plate, via two flexure members, wherein the two flexure members are attached to opposite ends of the spindle support plate, via first clamps, and are attached to opposite ends of the base plate, via second clamps;
a spindle disposed on the spindle support plate; and
an actuator coupled between the base plate and the spindle support plate, the actuator configured to engage an actuator mount attached to the spindle support plate, to displace the spindle support plate,
wherein the flexure members inhibit an off-axis drilling motion, as the spindle support plate is displaced.

2. The robotic end effector assembly of claim 1, wherein the actuator has a limited stroke configured to limit a distance that the spindle support plate is displaced by the actuator.

3. The robotic end effector assembly of claim 2, further comprising a stop assembly comprising a stop element attached to the base plate and a stop element engagement portion attached to the spindle support plate, wherein the stop element engagement portion is configured to engage the stop element, to limit the distance that the spindle support plate is displaced by the actuator.

4. The robotic end effector assembly of claim 1, wherein the spindle comprises one of, a motor driven spindle, a hydraulic driven spindle, and a pneumatically driven spindle.

5. The robotic end effector assembly of claim 1, wherein the spindle is coupled to the spindle support plate, via a spindle clamp attached to the spindle support plate.

6. The robotic end effector assembly of claim 5, further comprising a vacuum attachment coupled to the spindle clamp, the vacuum attachment configured for attachment to a vacuum assembly.

7. The robotic end effector assembly of claim 5, further comprising a sensor coupled to the spindle clamp, the sensor configured to measure a distance to a workpiece to be drilled.

8. The robotic end effector assembly of claim 1, wherein the two flexure members comprise flexure plates comprised of a flexible material.

9. The robotic end effector assembly of claim 8, wherein the flexible material comprising the flexure plates is, including a spring steel.

10. The robotic end effector assembly of claim 1, wherein the two flexure members are positioned in a parallel arrangement between the spindle support plate and the base plate, and a force of the actuator actuating between the spindle support plate and the base plate results in a deflection of the two flexure members to form a parallelogram configuration by the two flexure members.

11. The robotic end effector assembly of claim 1, wherein the two flexure members allow a linear motion along an axis of the spindle, to inhibit the off-axis drilling motion, as the spindle support plate is displaced.

12. The robotic end effector assembly of claim 1, wherein the actuator comprises a linear actuator comprising one of, motor driven, hydraulic driven, piezoelectric driven, solenoid driven, and pneumatically driven.

13. A drilling system comprising:
a robot comprising a robotic drilling unit having a robotic end effector attachment portion;
a robotic end effector assembly attached to the robot, the robotic end effector assembly comprising:
a base attached to the robotic end effector attachment portion, the base comprising a robot adapter coupled to a base plate;
a spindle support plate positioned substantially parallel with and coupled to the base plate, via two flexure plates each comprised of a flexible material, wherein the two flexure plates are attached to opposite ends of the spindle support plate, via first clamps, and are attached to opposite ends of the base plate, via second clamps;
a spindle coupled to the spindle support plate, via a spindle clamp attached to the spindle support plate; and
a linear actuator coupled between the base plate and the spindle support plate, the linear actuator attached to the base plate, via a first actuator mount, and the linear actuator configured to engage a second actuator mount attached to the spindle support plate, to displace the spindle support plate; and
a structure comprising a workpiece positioned opposite the spindle of the robotic end effector assembly, the spindle configured to perform a drilling operation on the structure,
wherein the flexure plates maintain an alignment of the spindle along an axis of the spindle, and inhibit an off-axis spindle drilling motion, as the spindle support plate is displaced.

14. The drilling system of claim 13, wherein the linear actuator has a limited stroke configured to limit a distance that the spindle support plate is displaced by the linear actuator.

15. The drilling system of claim 14, wherein the robotic end effector assembly further comprises a stop assembly comprising a stop element attached to the base plate and a stop element engagement portion attached to the spindle support plate, wherein the stop element engagement portion is configured to engage the stop element, to limit the distance that the spindle support plate is displaced by the linear actuator.

16. The drilling system of claim 13, wherein the two flexure plates are positioned in a parallel arrangement between the spindle support plate and the base plate, and a force of the linear actuator actuating between the spindle support plate and the base plate results in a deflection of the two flexure plates to form a parallelogram configuration by the two flexure plates.

17. A method of using a robotic end effector assembly to perform a drilling operation on a structure, the method comprising the steps of:
assembling a robotic end effector assembly, the robotic end effector assembly comprising:
a base comprising a robot adapter coupled to a base plate;
a spindle support plate positioned substantially parallel with and coupled to the base plate, via two flexure members, wherein the two flexure members are attached to opposite ends of the spindle support plate, via first clamps, and are attached to opposite ends of the base plate, via second clamps;
a spindle coupled to the spindle support plate, via a spindle clamp attached to the spindle support plate; and
an actuator coupled between the base plate and the spindle support plate, the actuator attached to the base plate, via a first actuator mount;

attaching the robotic end effector assembly to a robot comprising a robotic drilling unit;

positioning the robotic end effector assembly opposite the structure to be drilled, so that the spindle faces the structure;

actuating the actuator to engage a second actuator mount attached to the spindle support plate, to displace the spindle support plate;

contacting a surface of the structure with the spindle to perform the drilling operation, and deflecting the two flexure members by a force of the actuator; and inhibiting an off-axis drilling motion, as the spindle support plate is displaced, and maintaining, with the flexure members, an alignment of the spindle normal to the surface of the structure.

18. The method of claim 17, wherein assembling the robotic end effector assembly, further comprises assembling the robotic end effector assembly with the actuator comprising a linear actuator, and having a limited stroke configured to limit a distance that the spindle support plate is displaced by the actuator.

19. The method of claim 18, wherein assembling the robotic end effector assembly, further comprises assembling the robotic end effector assembly comprising a stop assembly comprising a stop element attached to the base plate and a stop element engagement portion attached to the spindle support plate, wherein the stop element engagement portion is configured to engage the stop element, to limit the distance that the spindle support plate is displaced by the actuator.

20. The method of claim 17, wherein contacting the surface of the structure with the spindle to perform the drilling operation further comprises contacting the surface comprising an acoustic surface to perform the drilling operation comprising one of, drilling, spindle drilling, perforating, slotting, cutting, and milling.

\* \* \* \* \*